(12) United States Patent
Takahashi et al.

(10) Patent No.: US 8,591,342 B2
(45) Date of Patent: Nov. 26, 2013

(54) GAME SYSTEM, GAME CONTROL METHOD, PORTABLE GAME DEVICE, AND COMPUTER-READABLE STORAGE MEDIUM

(71) Applicant: Nintendo Co., Ltd., Kyoto (JP)

(72) Inventors: Hiroyuki Takahashi, Tokyo (JP); Shugo Takahashi, Tokyo (JP); Yusuke Sugimoto, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/713,758

(22) Filed: Dec. 13, 2012

(65) Prior Publication Data

US 2013/0217502 A1  Aug. 22, 2013

(30) Foreign Application Priority Data

Feb. 16, 2012  (JP) .................................. 2012-031609

(51) Int. Cl.
*G06F 9/24* (2006.01)
(52) U.S. Cl.
USPC .................... 463/42; 463/31; 463/32; 463/40

(58) Field of Classification Search
USPC .......................................... 463/42, 31, 32, 40
See application file for complete search history.

(56) References Cited

U.S. PATENT DOCUMENTS

| 6,951,516 B1* | 10/2005 | Eguchi et al. .................... 463/40 |
| 7,968,787 B2* | 6/2011 | Ueki ............................... 84/626 |
| 2010/0325235 A1 | 12/2010 | Konno et al. |

FOREIGN PATENT DOCUMENTS

JP  2011-000309  1/2011

* cited by examiner

*Primary Examiner* — Pierre E Elisca
(74) *Attorney, Agent, or Firm* — Nixon & Vanderhye P.C.

(57) ABSTRACT

An example game device automatically receives character data from another game device positioned nearby through wireless communication, and generates an other-player character based on the character data. Further, a game is executed with the other-player character which is automatically controlled and a player character. Acquisition information is generated which enables the other game device to acquire points according to a result of the game. After the acquisition information is generated, the wireless communication is automatically conducted with the other game device to transmit the acquisition information to the other portable game device.

24 Claims, 15 Drawing Sheets

FIG.9

| CHARACTER IDENTIFICATION INFORMATION | ACQUISITION INFORMATION |
|---|---|
| CHARACTER IDENTIFICATION INFORMATION_f41 | ACQUISITION INFORMATION_f51 |
| CHARACTER IDENTIFICATION INFORMATION_f42 | ACQUISITION INFORMATION_f52 |
| CHARACTER IDENTIFICATION INFORMATION_f43 | ACQUISITION INFORMATION_f53 |
| ... | ... |

D3(D3a,D3b)

D13 — (rows), D30 — (rows)

FIG.10

| SEQUENCE INFORMATION | OTHER-PLAYER CHARACTER DATA |
|---|---|
| SEQUENCE INFORMATION_F61 | OTHER-PLAYER CHARACTER DATA_F71 |
| SEQUENCE INFORMATION_F62 | OTHER-PLAYER CHARACTER DATA_F72 |
| SEQUENCE INFORMATION_F63 | OTHER-PLAYER CHARACTER DATA_F73 |
| ... | ... |

D21

D221 — (rows), D2b — (rows)

GAME SYSTEM, GAME CONTROL METHOD, PORTABLE GAME DEVICE, AND COMPUTER-READABLE STORAGE MEDIUM

The present application claims priority from Japanese Patent Application No. 2012-31609, which was filed on Feb. 16, 2012, the disclosure of which is herein incorporated by reference in its entirety.

FIELD

The technology herein relates to a game system, a game control method, a portable game device, and a computer-readable storage medium which enable wireless communication to be automatically conducted between portable game devices located close to each other, and which executes games with data received.

BACKGROUND AND SUMMARY

Traditionally, a game system has been known in which a portable game device automatically conducts wireless communication with another portable game device, receives data (character data, item data) from the other portable game device, and executes games with the data received.

In example embodiments dealing with a portable game device configured to execute a game with data transmitted/received automatically to/from a portable game device of another player closely located, a result of game executed with the data received is given as a feedback to the portable game device of the other player.

(1) An example embodiment is a game system including a player portable game device and at least one other-player portable game device which, while being close to each other, are capable of automatically conducting wireless communication with each other even when no game program is running. The game system includes: an other-player data receiver, an other-player generator, a game processor, an acquisition information generator, a transmitter, an acquisition information receiver, a first acquirer. The other-player data receiver is configured to automatically receive other-player data from the other-player portable game device through the wireless communication. The other-player generator is configured to generate an other-player character based on the other-player data. The game processor is configured to execute a game with the other-player character which is automatically controlled and a player character which is an object controllable by a player. The acquisition information generator is configured to generate acquisition information which enables the other-player portable game device to acquire an acquisition based on a result of the game, the acquisition being at least one of a predetermined item, a score, and a benefit. The transmitter is configured to transmit the acquisition information to the other-player portable game device by automatically conducting wireless communication with the other-player portable game device after the acquisition information is generated. The acquisition information receiver is configured to automatically receive the acquisition information through the wireless communication. The first acquirer is configured to acquire the acquisition based on the acquisition information received.

With the structure, the other-player data is automatically received from the other-player portable game device through the wireless communication, and the other-player character is generated using this other-player data. Then, the game is executed with the other-player character and the player character. In this game, the other-player character is automatically controlled (computer-controlled), and the player character is controlled by the player operation. Then, the acquisition information is generated which enables the other-player portable game device to acquire an acquisition based on a result of the game, the acquisition being at least one of a predetermined item, a score, and a benefit. This acquisition information generated is automatically transmitted to the other-player portable game device through the wireless communication. Since the other-player portable game device (technically, the player of this device) having received this acquisition information is able to acquire an acquisition based on the acquisition information, it is possible to acquire an acquisition based on the game result, using the received data. This enables the portable game device to send as a feedback the result of the game using the other-player data received to the other-player portable game device having transmitted the other-player data. Further, the other-player portable game device is able to receive as a feedback the result of game using the other-player data automatically transmitted.

Since the player of the other-player portable game device is able to acquire an acquisition in a way other than playing a game in the other-player portable game device, the way of acquiring the acquisition is diversified. Since the chances of obtaining an acquisition will increase with an increase in the number of portable game devices approached, it is possible to give the player of the other-player portable game device an enjoyment of carrying the other-player portable game device.

(2) In the game system, the game processor may execute a competing game in which the player character and the other-player character compete against each other. This enables the other-player portable game device to acquire an acquisition based on a result of the competing game.

(3) The game system may further include a judging component. The judging component is configured to judge which one of the player character and the other-player character wins the competing game. The acquisition information generator may generate the acquisition information only when the other-player character wins, based on a result of judgment by the judging component. With this structure, the portable game device is able to enable the other-player portable game device to acuire an acquisition only when the other-player character generated using the other-player data wins the game. Thus, by generating other-player data that likely leads to winning in the game, the other-player portable game device is able to acquire an acquisition through the acquisition information received. This gives the player of the other-player portable game device an enjoyment of generating other-player data that leads to winning in the game. Note that the other-player data that likely leads to wins in the game is for example other-player data that allows generation of an other-player character with high performance.

(4) The game system may further include a second acquirer. When the player character wins based on the judgment by the judging component, the second acquirer may enable the player to acquire an acquisition identical to or different from the acquisition acquired by the other-player portable game device. With this structure, the portable game device is able to enable its player to acquire an acquisition only when the player character wins over the other-player character. This motivates the player of the portable game device to win over the other-player character.

(5) In the game system, the game processor may execute a cooperating game in which the player character cooperates with the other-player character to progress the game. This enables the other-player portable game device to acquire an acquisition based on a result of the cooperating game.

(6) The game system may further include a third acquirer. The third acquirer enables the player to acquire the acquisition according to a result of the game executed by the game processor. The acquisition information generator may generate the acquisition information which enables the other-player portable game device to acquire the acquisition identical to the acquisition acquired by the player with the use of the third acquirer. With this structure, the player character and the other-player character progress the game in cooperation with each other, and the player of the portable game device and the player of the other-player portable game device are able to acquire the same acquisition based on a result of the game. This causes the player of the portable game device to wish for an other-player data to achieve a preferable game result (result by which a preferable acquisition is obtainable) in cooperation and when receiving such other-player data, causes the player to be delighted. Note that the "an other-player data to achieve a preferable game result in cooperation" is for example other-player data that allows generation of an other-player character with high performance.

(7) The system may further include a determiner. The game processor may execute a game in which the player character plays a ball game against the other-player character. The determiner may be configured to determine the acquisition based on passing of a ball object through an item object arranged in a game space of the ball game. The acquisition information generator may generate the acquisition information which enables the other-player portable game device to acquire the acquisition determined by the determiner. With this structure, the player is able to play, in addition to a game which enable the player character to play a ball game with the other-player character, a game of letting pass the ball object in the ball game through an item object arranged in the game space. Further, for example, in cases of adopting the structure which enables the player of the portable game device to acquire the acquisition determined by the determiner, it is possible to motivate the player of the portable game device to cooperate with the other-player character so that the other-player character is able to let the ball pass as many item objects as possible. For example, in the tennis game, it is possible to have the player of the portable game device hit the ball to facilitate the shot by the other-player character, and this improves the enjoyment of the game.

(8) The system may further include a player data generator. The player data generator may generate player data to be used as the other-player data in the other-player portable game device. The transmitter may transmit the player data to the other-player portable game device. This structure enables transmission of the player data to the other-player portable game device, as the other-player data. In the other-player portable game device, the other-player character is generated based on the player data and is used in a game along with the player character of the other-player portable game device. By receiving from the other-player portable game device the acquisition information, based on a result of the game, the player portable game device is able to acquire an acquisition based on the result of the game in the other-player portable game device. Thus, the player data (other-player data) and the acquisition information are bi-directionally transmitted and received between the portable game device and the other-player portable game device.

(9) The game system may further include a log storage. The log storage may be configured to store playing log and/or a status of the game played by the player. The player data generator generates the player data containing the playing log and/or the status of the game stored in the log storage. The game processor controls motions of the other-player character generated based on playing log and/or a status of the game contained in the other-player data. With this structure, the other-player character based on the player data is controlled based on the playing log and/or the status of the game played by the player of the portable game device, in the other-player portable game device. Thus, the better the playing log and/or the status, the more preferable the result of the game in the other-player portable game device becomes, and the acquisition acquired based on the acquisition information from the other-player portable game device becomes more preferable as such. This motivates the player of the player portable game device to improve the player's playing log and/or the status of the game. It is therefore possible to improve the enjoyment of the game.

(10) The other-player data receiver and the transmitter may directly conduct the wireless communication with the other-player portable game device, without having another device relaying the wireless communication. This structure enables the player portable game device to perform wireless communication with an other-player portable game device located nearby without another device relaying the communication. Therefore, even when the communication status with the other device is not good, communication is possible as long as the communication status is good between the player portable game device and the other-player portable game device.

(11) The system may further include a position specifying unit configured to specify the position of the player portable device. When the player portable device is determined as to be nearby the other-player portable device based on the specified position of the player portable device, the other-player data receiver and the transmitter conduct the wireless communication with the other-player portable device via a predetermined server. This structure enables the player portable game device and the other-player portable game device to transmit and receive data therebetween, even when the player portable game device is not positioned within a short distance that enables direct communication, from the other-player portable game device. This is advantageous in that the range in which the player portable game device and the other-player portable game device are able to transmit and receive data is not limited to the range in which the player portable game device and the other-player portable game device are able to directly communicate with each other. Thus, communication between the player portable game device and the other-player portable game device is possible, even in areas where the portable game devices are not widely spread and the player portable game device and the other-player portable game device are hardly positioned within a communicable range from each other.

The above described example embodiment may be implemented in the form of game control method, portable game device, and computer-readable storage medium.

With the example embodiment, the player portable game device is able to transmit to the other-player portable game device the acquisition information which enables the other-player portable game device to acquire an acquisition based on a result of game with the data received from the other-player portable game device. By enabling the other-player portable game device to acquire the acquisition based on the acquisition information, the other-player portable game device is able to acquire the acquisition based on the result of the game using the data received from the other-player portable game device. Thus, the player portable game device is able to send as a feedback the result of game executed with the other-player data, to the other-player portable game device having transmitted the other-player data. Further, the other-player portable game device is able to receive as a feedback the result of game using the other-player data automatically transmitted.

BRIEF DESCRIPTION OF THE DRAWINGS

FIG. 9 shows example non-limiting acquisition data.

FIG. 10 shows an example non-limiting other-player list.

DETAILED DESCRIPTION OF NON-LIMITING EXAMPLE EMBODIMENTS

First Embodiment

The following describes, with reference to attached drawings, a first embodiment to which the technology herein is applied.

[Structure of Game Device 1]

Figure 1:
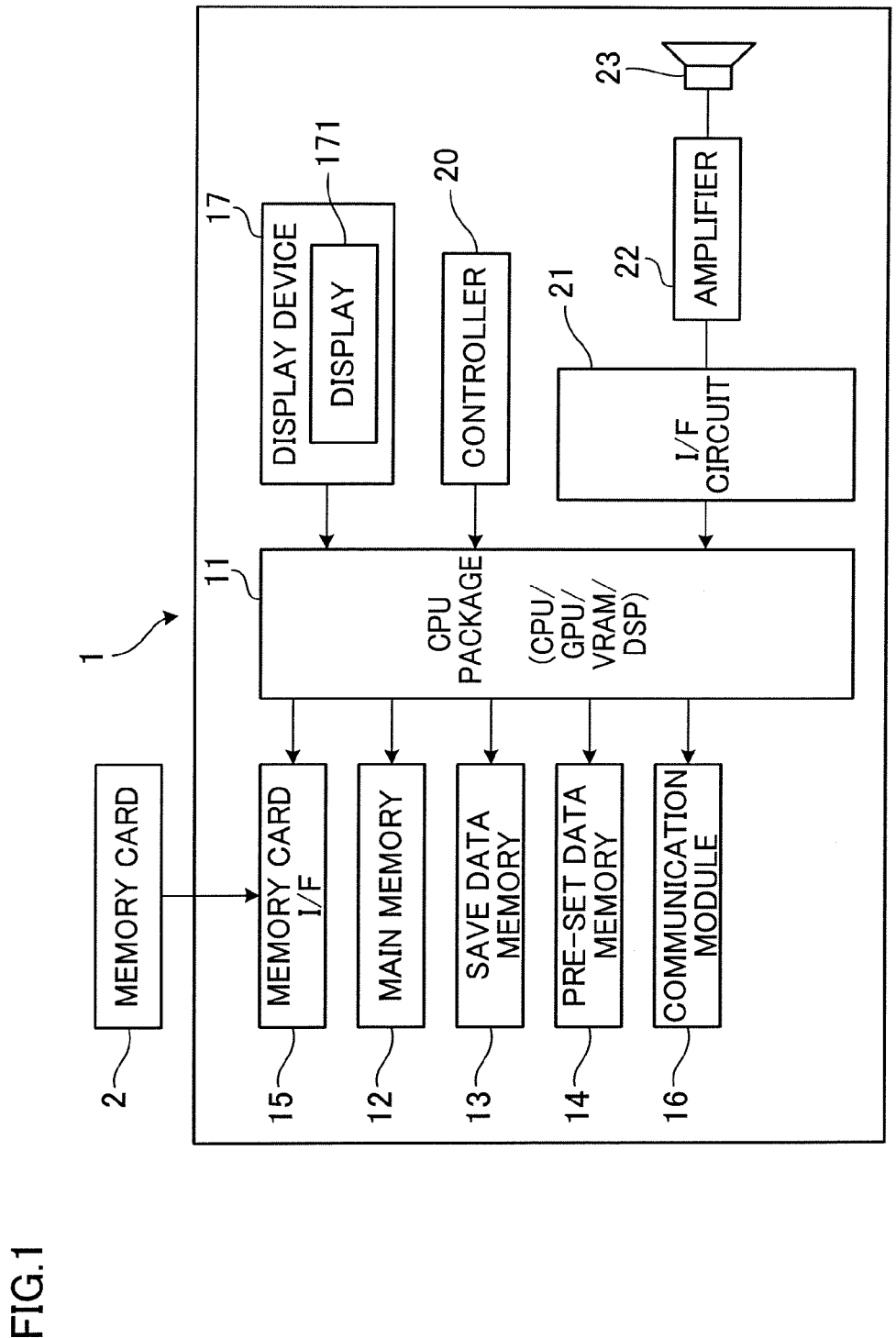
FIG. 1 shows a block diagram showing an example non-limiting internal structure of a game device related to a first embodiment.

FIG. 1 shows a block diagram showing an example non-limiting internal structure of a portable game device (hereinafter, simply referred to as "game device") related to the first embodiment. The game device 1 includes: a CPU package 11, a main memory 12, a save data memory 13, a pre-set data memory 14, a memory card interface (memory card I/F) 15, a communication module 16, a display device 17, a controller 20, an interface circuit (I/F circuit) 21, and the like.

The CPU package 11 (as an example of an other-player data receiver, an other-player generator, a game processor, an acquisition information generator, a transmitter, an acquisition information receiver, a first acquirer, a judging component, a second acquirer, a determiner, a player data generator) is connected to a main memory 12, a save data memory 13, a pre-set data memory 14, a memory card I/F 15, a communication module 16, a display device 17, a controller 20, an I/F circuit 21, or the like via not-shown buses.

In the CPU package 11 is provided a CPU which runs a predetermined program to conduct predetermined information processing. The CPU has two cores (dual-core), one of which runs a communication program to execute a communication process, and the other one of which runs an application program to execute a later-described main process. Note that, in the communication process in the first embodiment (hereinafter, "StreetPass communication process"), a communication partner (e.g., another game device 1 to be the communication partner) is automatically searched at every predetermined cycle, and data transmission and reception take place with the communication partner when a communication partner is found (hereinafter, "StreetPass communication"). Since the StreetPass communication process and the main process are executed by different cores respectively, these processes are executable at the same time.

The CPU package 11 also has, in addition to the CPU, a GPU (Graphics Processor Unit), a DSP (Digital Signal Processor), a VRAM (Video RAM), or the like. These structural elements are connected to one another within the CPU package 11. It should however be noted that, while these structural elements are formed into a single chip in the first embodiment, the elements do not have to be formed in a single chip. Further, the number of cores in the CPU is not limited to two, and the number may be one or a number which is equal to or greater than three.

The GPU generates an image according to graphics commands from the CPU. The VRAM stores therein data (polygon data, texture data, or the like) for use in generating the image. In the VRAM is set a frame buffer for storing the image generated by the GPU.

The DSP functions as an audio processor, and generates or reproduces audio data by using data (PCM data or the like) stored in the main memory 12. Note that the CPU package 11 is referred to as "CPU 11" in the following description.

The main memory 12 serves as a work area for the CPU 11. In other words, the main memory 12 stores: a predetermined program obtained from the outside via a memory card I/F 15, a communication module 16, or the like; and/or various types of data to be used in the StreetPass communication process or the main process. For example, PSRAM (Pseudo-SRAM) is adoptable as this main memory 12.

The save data memory 13 (example of a log storage) is a rewritable and nonvolatile memory. For example a NAND flash memory is adoptable as the save data memory 13. The pre-set data memory 14 is a nonvolatile memory, and is a memory for storing a boot program of the game device 1, pre-set parameters, or the like. For example, a flash memory is adoptable as the pre-set data memory 14.

To the memory card I/F 15 is detachably connected the memory card 2. To and from this memory card 2, the memory card I/F 15 writes and reads data according to instructions from the CPU 11. Note that the game device 1 may be structured so that another storage medium is connectable thereto, in place of or in addition to the memory card 2. For example, the game device 1 may be structured so that the following storage media are connectable thereto: another semiconductor memory type storage medium; a storage medium (CD-ROM, DVD, or the like) adopting an optical recording method; a storage medium (magnetic tape, Floppy® disk, hard disk, magnetic card, or the like) adopting magnetic recording method.

The communication module 16 has a function of conducting wireless communication with another information processing device (e.g., server, or the like), in compliance with a communication standard of IEEE802.11b/g, or the like. Further, the communication module 16 has a function of conducting short distance wireless communication with another game device 1 of the same model (e.g., the other device being positioned within 10 m from the game device 1), based on a predetermined communication scheme (e.g., communication following an original protocol, or the like). Through this short distance wireless communication, the game device 1 conducts a later-described StreetPass communication with the other game device 1 (For the sake of clear understanding, the game device 1 and the other game device 1 are hereinafter referred to as player game device 1 and as other-player game device 1, as needed).

For example, the display device 17 is a liquid crystal display device having a display 171 such as a liquid crystal display.

The controller 20 has at least one operation component which receives an operation by a user. Operation information received via the operation component is transmitted to the CPU 11.

The I/F circuit 21 includes an audio control circuit for controlling an amplifier 22. This audio control circuit executes a predetermined audio signal processing with respect to audio data input by the CPU 11 based on the instructions from the CPU 11, converts the audio data processed into analog data, and outputs the analog audio data converted to the amplifier 22.

The amplifier 22 connects to a speaker 23, and amplifies audio signals input from the I/F circuit 21 and outputs the amplified signals to the speaker 23. The speaker 23 outputs an audio based on an input from the amplifier 22.

[Structure of Game System]

Figure 2:
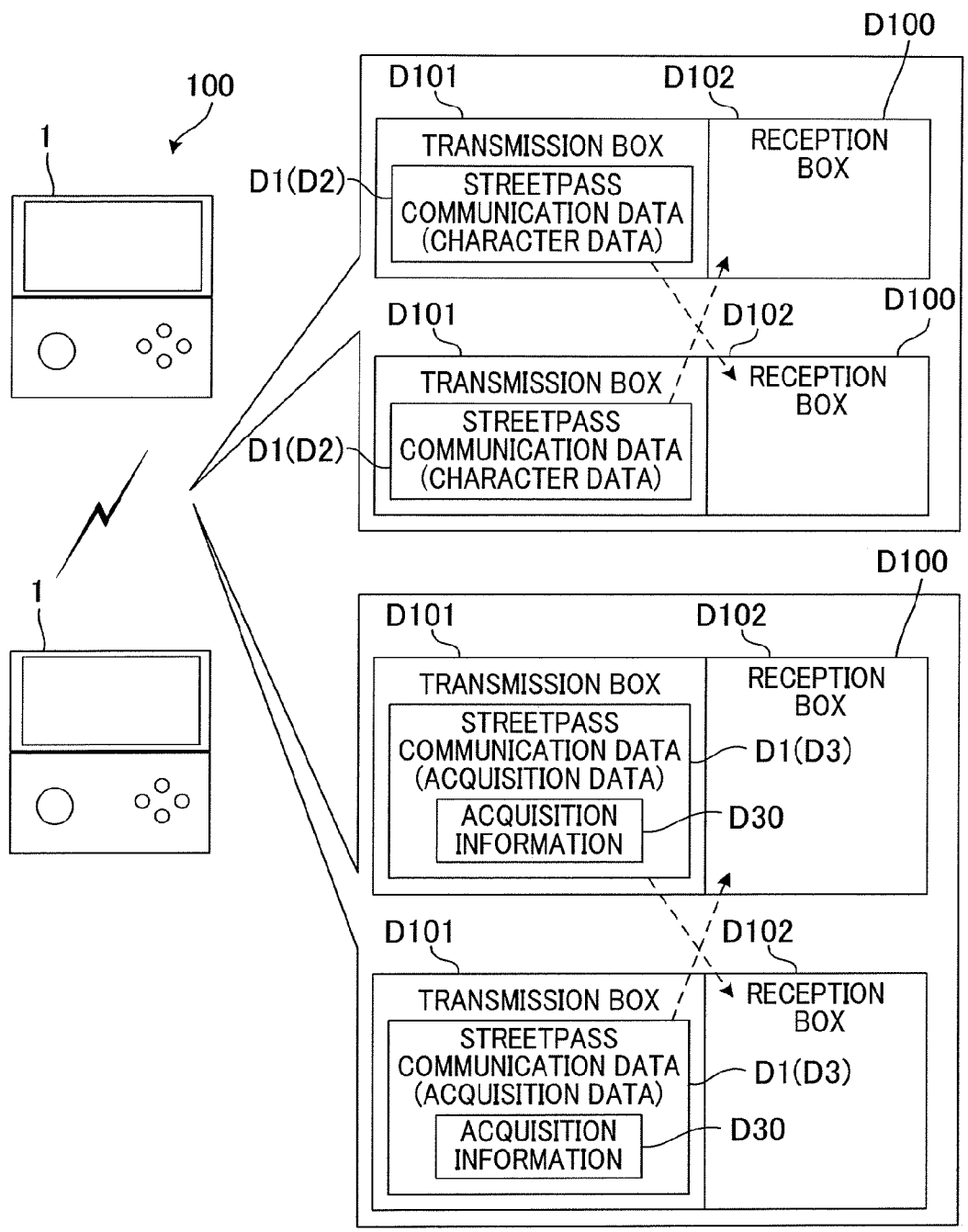
FIG. 2 shows an example non-limiting game system of the first embodiment.

The following describes a game system 100 related to the first embodiment with reference to FIG. 2. FIG. 2 shows an example non-limiting game system related to the first embodiment. The game system 100 includes a plurality of game devices 1. Although FIG. 2 only shows two game devices 1, the game system 100 may include three or more game devices 1.

The game devices 1, while being positioned close to each other (positioned within a range in which short distance wireless communication is possible), conduct direct short distance wireless communication without another device relaying the communication, based on a predetermined communication scheme. Through this communication, the StreetPass communication takes place between the game devices 1. In the StreetPass communication, each game device 1 repeats a process of automatically searching for a communication partner (an other-player game device 1) at every predetermined cycle, and when an other-player game device 1 is found, executes a process (StreetPass communication process) of transmitting/receiving StreetPass communication data D1 (example of the player data and the other-player data) to/from the other-player game device 1. This StreetPass communication process is detailed later with reference to FIG. 11. Note that the StreetPass communication may be executed only when the game device 1 is in a sleep mode, or executed during the sleep mode and while an application program is running at the same time. Note further that the sleep mode means a power-saving mode in which power is supplied only partially to the structure of the game device 1 (e.g., CPU 11, the main memory 12, the save data memory 13, the communication module 16, or the like).

[Overview of StreetPass Communication]

First, the following describes an overview of the StreetPass communication with reference to FIG. 2, followed by the details of the StreetPass communication. In the StreetPass communication, the StreetPass communication data D1 is transmitted and received between two game devices 1 with the same application program.

Each game device 1 stores communication-use data D100. The communication-use data D100 includes: a transmission box D101 for registering thereto the StreetPass communication data D1 to be transmitted in the StreetPass communication; and a reception box D102 for registering thereto the StreetPass communication data D1 received in the StreetPass communication. Each game device 1 copies the StreetPass communication data D1 registered to its transmission box D101, and transmits the copy of the StreetPass communication data D1 to another game device 1 through the StreetPass communication. Through this StreetPass communication, each game device 1 receives from the other-player game device 1 the StreetPass communication data D1 which is a copy of the StreetPass communication data D1 registered to the transmission box D101 of the other-player game device 1. As described, each of the two game devices 1 transmits and receives, through the StreetPass communication, the StreetPass communication data D1 identical to the one registered to its transmission box D101.

[Overview of StreetPass Communication: StreetPass Communication Data (Character Data)]

With reference to FIG. 2, the following describes a specific example of the StreetPass communication data D1 transmitted and received between two game devices 1 through the StreetPass communication. In the first embodiment, each game device 1 is capable of generating character data D2 (example of the player data and the other-player data) by running a predetermined character generating program. The character data D2 generated in each of the two game devices 1 is transmitted and received as the StreetPass communication data D1 through the StreetPass communication. When however the character data D2 is registered to the transmission box D101 of only one of the two game devices 1, there will be one-way transmission to transmit the character data D2 from that one of the game devices 1 to the other game device 1.

[Overview of StreetPass Communication: Game Using StreetPass Communication Data Received]

Each game device 1 registers to its reception box D102 the StreetPass communication data D1 received from another game device 1. This StreetPass communication data D1 registered to the reception box D102 is then used by the game device 1 when running an application program.

Figure 3:
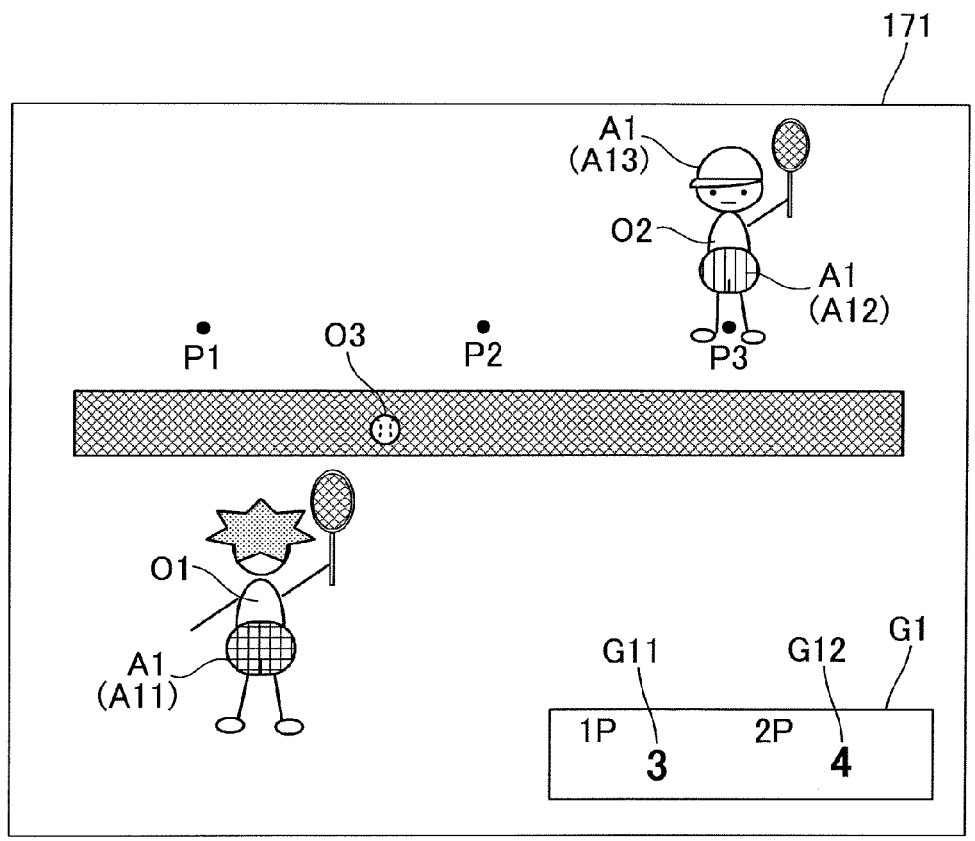
FIG. 3 shows an example non-limiting screen of the game device related to the first embodiment.

With reference to FIG. 3, the following describes a specific example of how the StreetPass communication data D1 (character data D2) registered to the reception box D102 is used in a game executed by running the application program. FIG. 3 shows an example non-limiting screen of the game device 1 related to the first embodiment. The game device 1 (player game device 1) executes a tennis game by running the application program. In this tennis game, the player game device 1 enables a player character O1 to compete against an other-player character O2 within a three dimensional virtual game space. The position, the posture (motion), the direction, and the like of the player character O1 are controlled according to the operation of the player game device 1 by the player. On the other hand, the position, the posture (motion), the direction, and the like of the other-player character O2 are automatically controlled by the CPU 11.

The player game device 1 uses the character data D2 generated therein to generate the player character O1. Further, the player game device 1 generates the other-player character O2 based on the character data D2 registered to its reception box D102. This way, the player game device 1 enables the player character O1 generated therein to compete against the other-player character O2 which is identical to the player character O1 generated in the other-player game device 1. Meanwhile, the player game device 1 transmits the character data D2 generated therein to the other-player game device 1 through the StreetPass communication. In this case, the player character O1 generated in the player game device 1 competes, as the other-player character O2, in the other-player game device 1 against the player character O1 which is generated in the other-player game device 1.

The tennis game of the first embodiment is carried out with the same rules as those of the tennis matches in the real world, and the player character O1 and the other-player character O2 alternately hit a ball object O3. Through the tennis games imitating the tennis matches in the real world, the player character O1 and the other-player character O2 compete against each other for higher scores. The score of the player character O1 and that of the other-player character O2 are indicated by the score gauge G1.

Then, only when the other-player character O2 wins the tennis game based on the scores, the player game device 1 generates acquisition information D30 which enables the other-player game device 1 to acquire a certain number of game points (example of points and an acquisition) based on the score of the other-player character O2. The player game device 1 then put the acquisition information D30 into acquisition data D3, and registers this acquisition data D3 as the StreetPass communication data D1 to the transmission box D101.

The player character O1 and the other-player character O2 can be equipped with decoration items A1 such as costumes. The relation of the decoration items A1 to the performances of the player character O1 and the other-player character O2 is described below. FIG. 3 shows a case where, of the decoration items A1, the player character O1 is equipped with a decoration item A11, and the other-player character O2 is equipped with decoration items A12 and A13. The decoration items A1 equipped affects the performance (e.g., the status such as the character level, the stamina of character, the moving speed of the character, rotational speed of the ball object, or the like) of the character (player character O1, or the other-player character O2). For example, when the decoration item A11 equipped to the player character O1 is an item that accelerates the moving speed, the moving speed of the player character O1 is accelerated. Although the character data D2 contains decoration item information (example of the status) indicating the decoration items A1 equipped, the character data D2 may contain, instead of or in addition to the decoration item information, other information indicating the status (e.g., status parameters for use in controlling the motion of the character). Note that the status may be determined based on playing log of the player, instead of the decoration items A1.

The character data D2 further contains log information (service position, angle of shot, type of shot such as top spin or slice) which indicates the playing log of the tennis game played by the player of the game device 1 having generated the character data D2. Based on this log information (playing log) in the character data D2, the motion (service position, angle of shot, type of shot) of the other-player character O2 generated using the character data D2 is controlled.

[Overview of StreetPass Communication: StreetPass Communication Data (Acquisition Data)]

Returning to FIG. 2, the player game device 1 once again conducts StreetPass communication when the other-player game device 1 having transmitted the character data D2 is positioned nearby. If the acquisition data D3 is registered to the transmission box D101, the player game device 1 transmits a copy of the acquisition data D3 to the other-player game device 1 through the StreetPass communication. Further, if the acquisition data D3 is registered to the transmission box D101 of the other-player game device 1, the player game device 1 receives a copy of the acquisition data D3 from the other-player game device 1. This way, the player game device 1 transmits and receives the acquisition data D3 to and from the other-player game device 1.

If the acquisition data D3 received by the player game device 1 contains acquisition information D30 which is attributed to a winning in the other-player game device 1 by the other-player character O2 generated based on the character data D2 of the player game device 1, the player game device 1 obtains the acquisition information D30. This way, a result of the game in the player game device 1 of the first embodiment, using the character data D2 received from the other-player game device 1 through the StreetPass communication, is sent as a feedback to the other-player game device 1 through another StreetPass communication conducted once again. Meanwhile, through this StreetPass communication conducted once again, the player game device 1 is able to receive as a feedback a result of the game in the other-player game device 1, using the character data D2 transmitted to the other-player game device 1 through the StreetPass communication, from the other-player game device 1.

[Memory Map of Main Memory]

Figure 4:
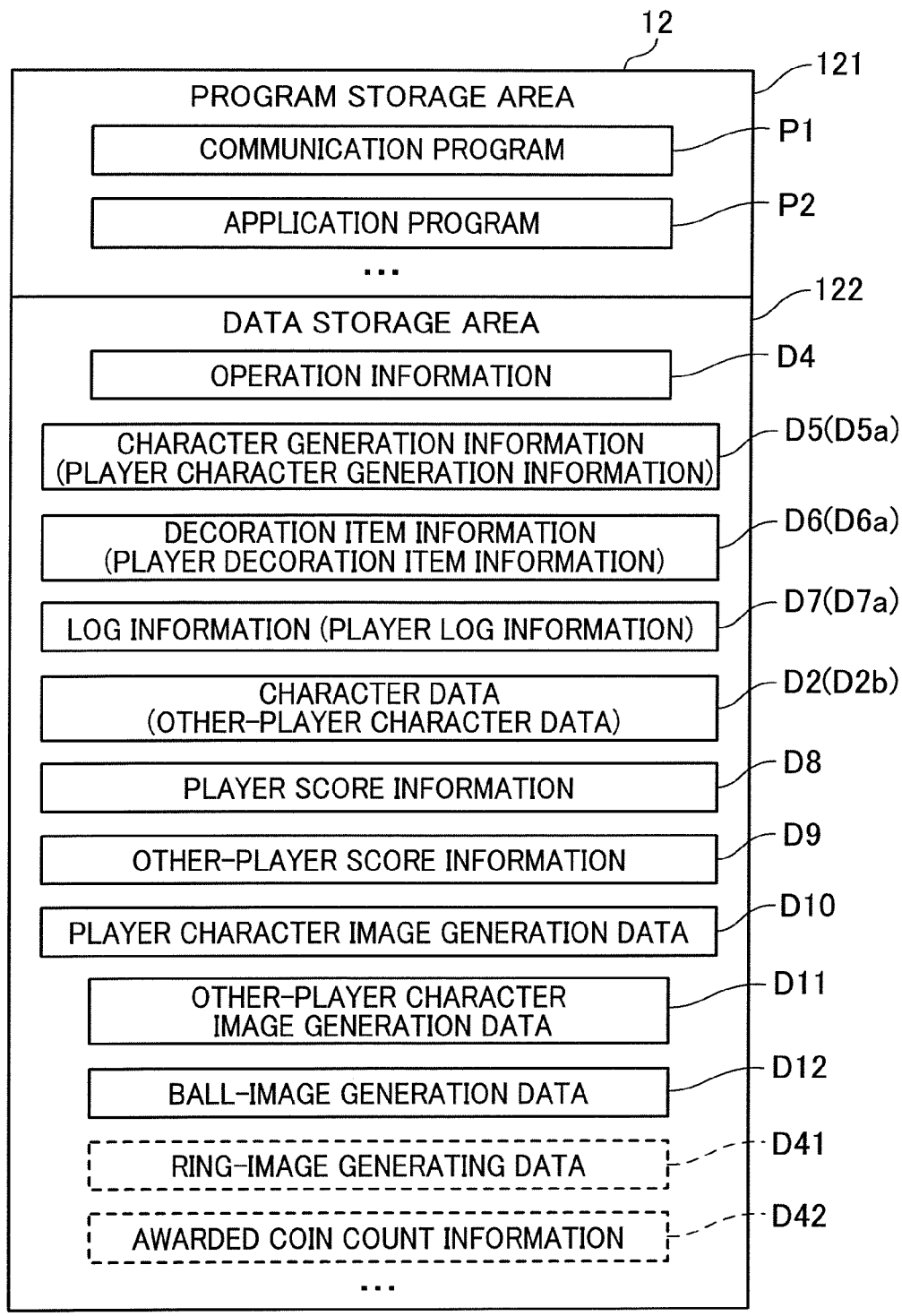
FIG. 4 shows an example non-limiting memory map of a main memory.
Figure 5:
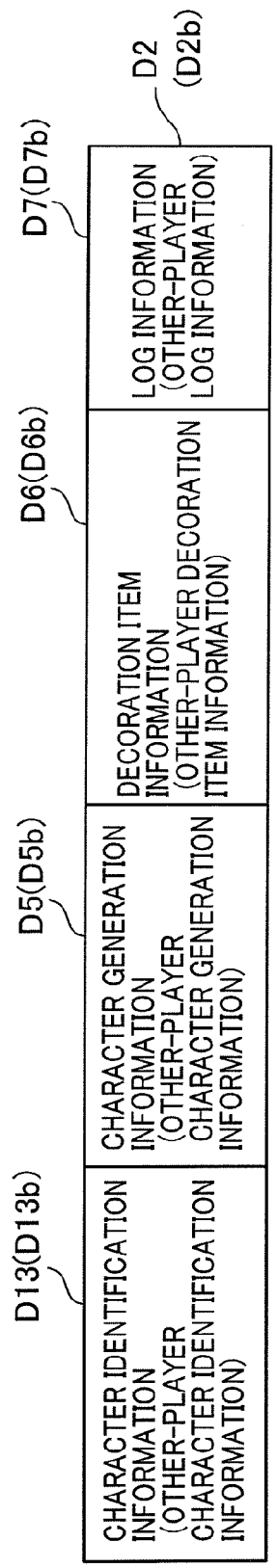
FIG. 5 shows example non-limiting other-player character data.

The following describes with reference to FIG. 4 and FIG. 5 data and programs stored in the main memory 12 of FIG. 1. FIG. 4 shows an example non-limiting memory map of the main memory. FIG. 5 shows an example non-limiting other-player character data. As shown in FIG. 4, the main memory 12 includes a program storage area 121 and a data storage area 122. In the program storage area 121 is stored a communication program P1 (example game control program), an application program P2 (example of the game control program), or the like. The communication program P1 is a program for causing the CPU 11 to execute the later-described StreetPass communication process. The application program P2 is a program for causing the CPU 11 to execute the later-described main process. The application program P2 contains data for use in the program.

Note that in the first embodiment, the communication program P1 and the application program P2 are read out as needed from a storage medium such as a memory card 2, and are stored in the main memory 12. It goes without saying that the communication program P1 and the application program P2 may be downloaded from a server or another game device 1 by using the communication module 16 and temporarily stored in the save data memory 13, and then read out from the save data memory 13 and stored in the main memory 12.

Through the communication program and the application program P2, the data storage area 122 stores therein operation information D4, character generation information D5 (player character generation information D5a), decoration item information D6 (player decoration item information D6a), log information D7 (player log information D7a), character data D2 (other-player character data D2b: example of other-player data), player score information D8, other-player score information D9, player character image generation data D10, other-player character image generation data D11, and ball-image generation data D12.

The operation information D4 is information input from the controller 20 in response to an operation of the controller 20 by the player. The character generation information D5 is information for generating a character. The character generation information D5 is, for example, information designating images of parts constituting the character; e.g., a hair image, a face image, a body image, and the like for the hair, face, the body, and the like of the character respectively. The character generation information D5 stored is player character generation information D5a for generating the player character O1. The decoration item information D6 is information designating the decoration item A1 to be equipped to the character.

The decoration item information D6 stored is player decoration item information D6a designating the decoration item A1 to be equipped to the player character O1. The log information D7 is information indicating the playing log of the tennis game played by the player. The log information D7 stored here is player log information D7a indicating the playing log in the player game device 1.

The other-player character data D2b is character data D2 received from the other-player game device 1, and is data read out from a later-described other-player list D21 (FIG. 10) when the application program P2 is run. As shown in FIG. 5, the other-player character data D2b contains character identification information D13 (other-player character identification information D13b), character generation information D5 (other-player character generation information D5b), decoration item information D6 (other-player decoration item information D6b), and log information D7 (other-player log information D7b).

The character identification information D13 is a unique identifier of each character. The character identification information D13 stored here is other-player character identification information D13b which is a unique identifier of the other-player character O2. The other-player character generation information D5b is the character generation information D5 for generating the other-player character O2. The other-player decoration item information D6b is the decoration item information D6 indicating the decoration item A1 equipped to the other-player character O2. The other-player log information D7b is the log information D7 indicating the playing log of the player of the other-player game device 1.

The player score information D8 indicates the score of the player character O1 in a current tennis game. The other-player score information D9 indicates the score of the other-player character O2 in the current tennis game.

The player character image generation data D10 is data for generating an image of the player character O1, and indicates the position, the direction, and the posture (motion) of the player character O1 in the game space. The other-player character image generation data D11 is data for generating an image of the other-player character O2, and indicates the position, the direction, and the posture (motion) of the other-player character O2 in the game space. The ball-image generation data D12 is data for generating an image of the ball object O3, and indicates the position, the moving speed, the moving direction, or the like of the ball object O3 in the game space.

(Memory Map of Save Data Memory)

Figure 6:
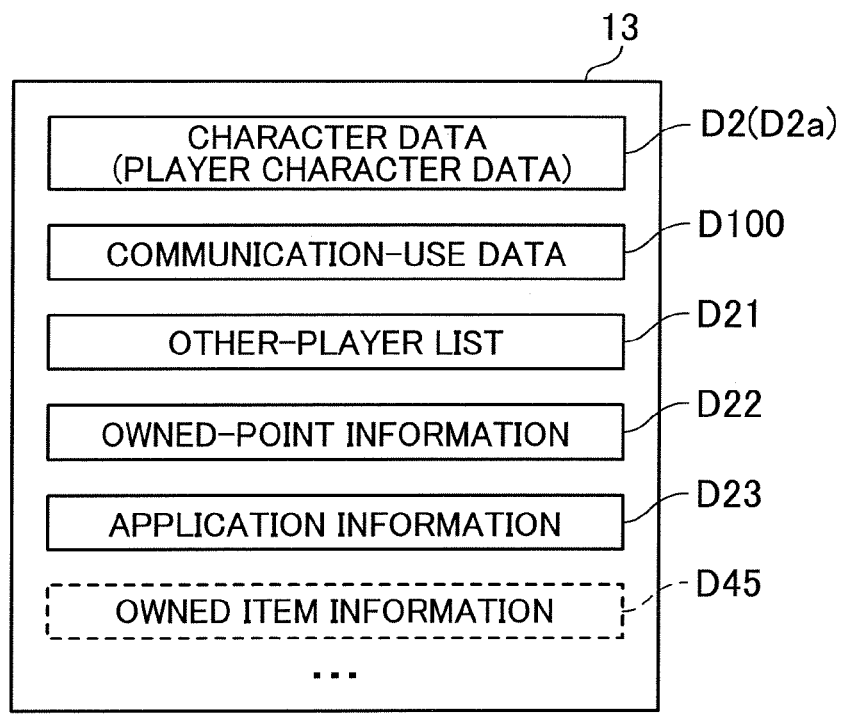
FIG. 6 shows an example non-limiting memory map of a save data memory.
Figure 7:
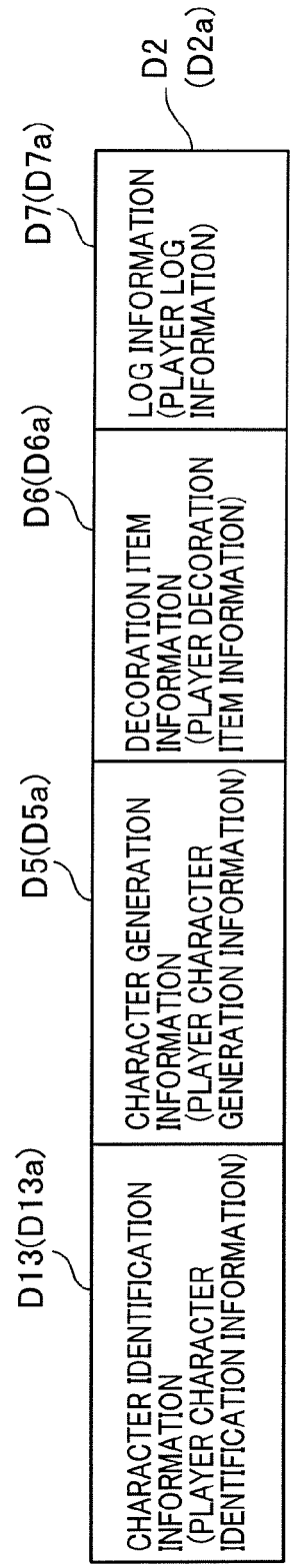
FIG. 7 shows example non-limiting player character data.
Figure 8:
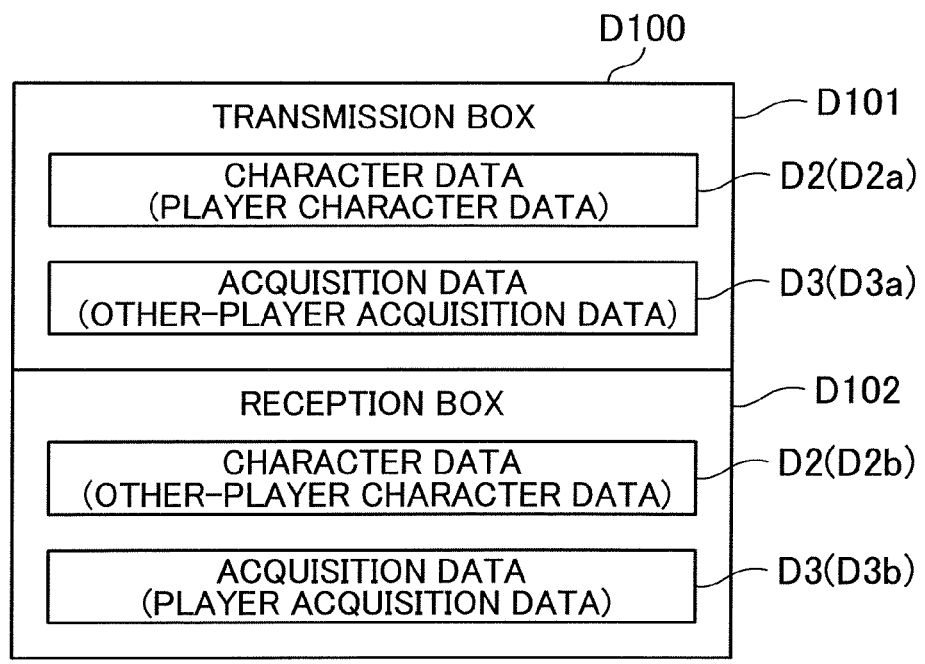
FIG. 8 shows example non-limiting communication-use data.

The following describes with reference to FIG. 6 to FIG. 10 exemplary data stored in the save data memory 13. FIG. 6 shows an example non-limiting memory map of the save data memory. FIG. 7 shows example non-limiting player character data. FIG. 8 shows example non-limiting communication-use data. FIG. 9 shows example non-limiting acquisition data. FIG. 10 shows an example non-limiting other-player list.

First, as shown in FIG. 6, the save data memory 13 stores therein the character data D2 (player character data D2a: an example of player data), the communication-use data D100, the other-player list D21, the owned-point information D22, the application information D23, and the like.

The player character data D2a is the character data D2 for generating the player character O1. As shown in FIG. 7, the player character data D2a contains the character identification information D13 (player character identification information D13a), the character generation information D5 (player character generation information D5a), the decoration item information D6 (player decoration item information D6a), and the log information D7 (player log information D7a). The player character identification information D13a is the character identification information D13 of the player character O1. The player character generation information D5a, the player decoration item information D6a, and the player log information D7a are the same as those stored in the main memory 12.

As shown in FIG. 8, the communication-use data D100 is structured by the transmission box D101 and the reception box D102. As is already described with reference to FIG. 2, to the transmission box D101, the StreetPass communication data D1 to be transmitted to the other-player game device 1 through the StreetPass communication is registered. Specifically, to the transmission box D101, the player character data D2a and the other-player acquisition data D3a are registered. The other-player acquisition data D3a is the acquisition data D3 generated in the player game device 1.

As shown in FIG. 9, the other-player acquisition data D3a contains the character identification information D13(other-player character identification information D13b) and the acquisition information D30 associated with this other-player character identification information D13b. When the other-player character O2 wins a tennis game, the player game device 1 registers to the acquisition data D3 the acquisition information D30 based on the score won by the other-player character O2 in the tennis game. Note that the acquisition information D30 is registered in association with the other-player character identification information D13b of the other-player character O2. In cases of receiving a plurality of sets of other-player character data D2b, the player character O1 may play a tennis game against a plurality of other-player characters O2. In this case, as shown in FIG. 9, the sets of the other-player acquisition data D3a contain a plurality of sets of acquisition information D30 for the plurality of other-player characters O2, respectively.

To the reception box D102 is registered the StreetPass communication data D1 received from the other-player game device 1 through the StreetPass communication, as is already described with reference to FIG. 2. Specifically, to the reception box D102, the other-player character data D2b and the player acquisition data D3b are registered as the StreetPass communication data D1. The player acquisition data D3b is acquisition data D3 generated in the other-player game device 1. As shown in FIG. 9, the player acquisition data D3b contains the character identification information D13 and the acquisition information D30 associated with the character identification information D13. The player game device 1 obtains acquisition information D30 corresponding to the player character identification information D13a from the player acquisition data D3b.

Returning to FIG. 6, the other-player list D21 is data for registering thereto the other-player character data D2b which is used for generating the other-player character O2 when the application program P2 is run. As shown in FIG. 10, the other-player character data D2b is registered to the other-player list D21, in association with sequence information D221 indicating the turn of the other-player character data D2b to be used in the tennis game. Note that the other-player character data D2b registered is data obtained from the reception box D102 (data received through the StreetPass communication). Note further that, when a plurality of sets of the other-player character data D2b are received, the other-player list D21 includes these sets of the other-player character data D2b.

Returning to FIG. 6, the owned-point information D22 is information indicating the game points owned by the player game device 1. Using the game points, a predetermined game item can be purchased through a server. For example, the decoration item A1 may be purchased and equipped to the player character O1. Note that the number of points owned increases based on the acquisition information D30 obtained from the player acquisition data D3b.

The application information D23 is information indicating the application program (application program P2) stored in the player game device 1.

[StreetPass Communication Process]

Figure 11:
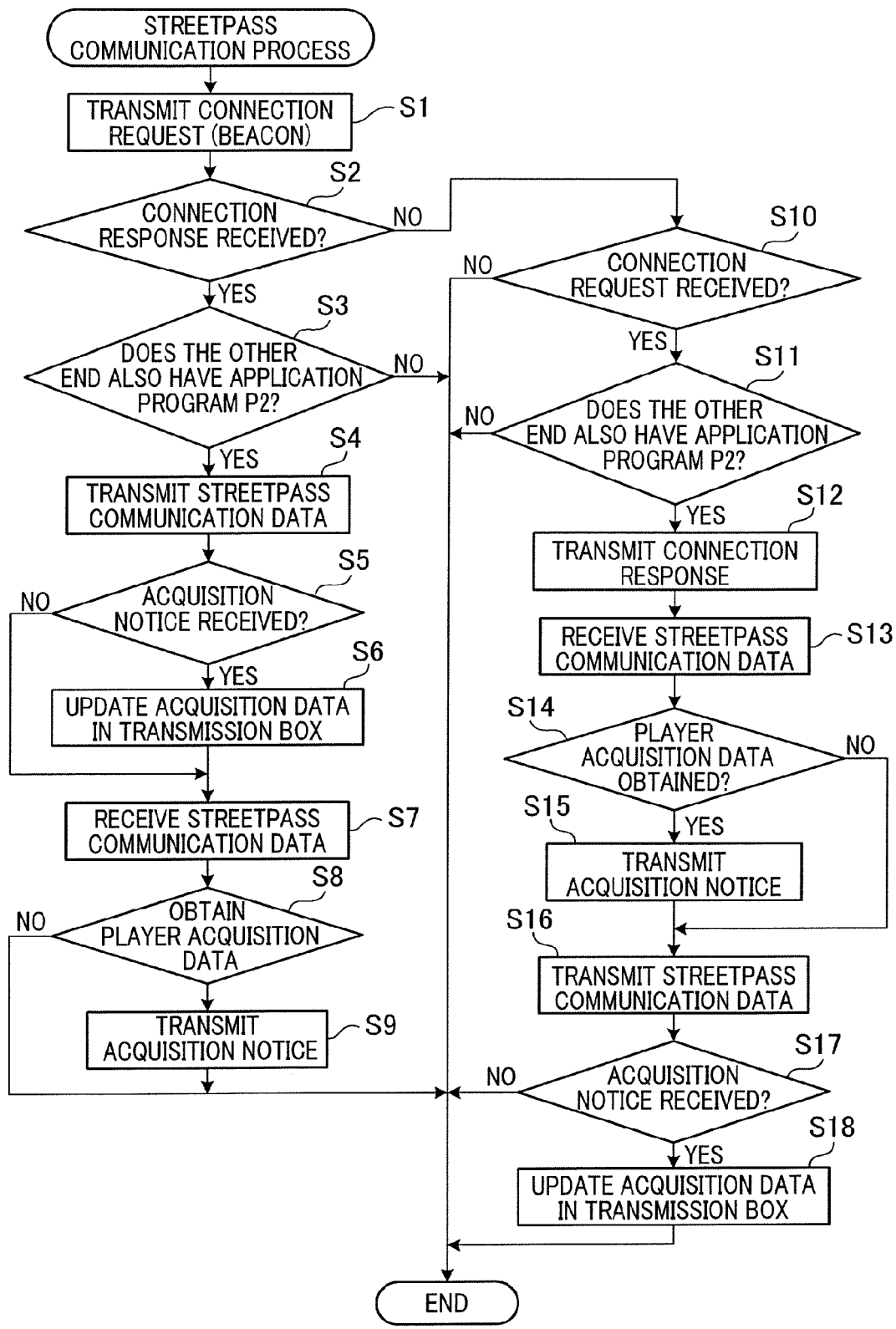
FIG. 11 shows an example non-limiting flowchart of a StreetPass communication process.

The following details the StreetPass communication with reference to FIG. 6, FIG. 8, and FIG. 11. FIG. 11 shows an example non-limiting flowchart of the StreetPass communication process. This StreetPass communication process is repetitively executed at every predetermined cycle. Note that the StreetPass communication process is always executed while the power is on (including the sleep mode). Note further that, when the main process is executed, the StreetPass communication process is executed in parallel, and is executed even when the main process is not executed.

First, the CPU 11 broadcasts a connection request (beacon) (S1). With this broadcasting of the connection request, an other-player game device 1 to become a communication partner is searched. Note that the connection request contains application information D23 and the media access control (MAC) address of the player game device 1. Note further that the application information D23 is used when a later-described step S11 is executed in the other-player game device 1.

Then, the CPU 11 determines whether a connection response is received in response to the connection request (S2). When it is determined that a connection response is received (S2: YES), the CPU 11 further determines whether the other-player game device 1 having transmitted the connection response stores the application program P2 (S3). This is done by referring to the application information D23 in the connection response and the application information D23 stored in the player game device 1.

When it is determined that the other-player game device 1 having transmitted the connection response stores no application program P2 (S3: NO), the CPU 11 ends the StreetPass communication process.

On the other hand, when it is determined that the other-player game device 1 having transmitted the connection response also stores the application program P2 (S3: YES), the CPU 11 transmits the StreetPass communication data D1 to the other-player game device 1 (S4). In this process, a copy of the entire StreetPass communication data D1 (the player character data D2a, the other-player acquisition data D3a) in the transmission box D101 is transmitted.

After that, the CPU 11 determines whether an acquisition notice is received from the other-player game device 1 (S5). This acquisition notice is received from the other-player game device 1, when the StreetPass communication data D1 transmitted in step S4 contains the other-player acquisition data D3a, and when the other-player game device 1 obtains this other-player acquisition data D3a as its player acquisition data D3b. Note that the wording "obtains" here means to register the player acquisition data D3b to the reception box D102. When it is determined that no acquisition notice is received from the other-player game device 1 (S5: NO), the process proceeds to step S7 under control of the CPU 11.

On the other hand, when it is determined that the acquisition notice is received from the other-player game device 1 (S5: YES), the CPU 11 updates the other-player acquisition data D3a in the transmission box D101 (S6). Specifically, the CPU 11 deletes, from the other-player acquisition data D3a, the other-player character identification information D13b corresponding to the one in the acquisition notice and the acquisition information D30 associated with this other-player character identification information D13b.

After that, the CPU 11 executes a process of receiving the StreetPass communication data D1 from the other-player game device 1 (StreetPass communication data reception process) (S7). When the StreetPass communication data D1 received through the StreetPass communication data reception process contains player character data D2a, the CPU 11 registers the player character data D2a to the reception box D102 as other-player character data D2b. At this time, the CPU 11 adds reception timestamp to the other-player character data D2b.

Further, when the StreetPass communication data D1 received through the StreetPass communication data reception process contains other-player acquisition data D3a, the CPU 11 executes the following process. Namely, the CPU 11 determines whether the other-player acquisition data D3a contains player character identification information D13a. If the other-player acquisition data D3a contains the player character identification information D13a, the CPU 11 registers to the reception box D102 the other-player acquisition data D3a received as player acquisition data D3b (obtains the player acquisition data D3b). At this time, the CPU 11 adds reception timestamp to the player acquisition data D3b. On the other hand, when the other-player acquisition data D3a contains no player character identification information D13a, the CPU 11 discards the other-player acquisition data D3a received.

The CPU 11 determines whether the player acquisition data D3b is obtained in step S7 (S8). When it is determined that the player acquisition data D3b is obtained (S8: YES), the CPU 11 transmits an acquisition notice to the game device 1 having transmitted the StreetPass communication data D1 in step S7 (S9). Note that this acquisition notice contains player character identification information D13a (other-player character identification information D13b for the other-player game device 1). After that, the CPU 11 ends the StreetPass communication process. Note that, when it is determined that no player acquisition data D3b is received (S8: NO), the StreetPass communication process ends without proceeding to step S9 under control of the CPU 11.

The following describes a process taking place when step S2 result in "NO". When it is determined that no connection response is received (S2: NO), the CPU 11 determines whether a connection request is received (S10). When it is determined that no connection request is received (S10: NO), the CPU 11 ends the StreetPass communication process. On the other hand, when it is determined that a connection request is received (S10: YES), the CPU 11 determines whether the other-player game device 1 having transmitted the connection request also stores the application program P2 (S11). The meaning and the method of the process of step S11 is the same as those of the process of step S3. When it is determined that the other-player game device 1 having transmitted the connection request stores no application program P2 (S11: NO), the CPU 11 ends the StreetPass communication process.

When it is determined that the application program P2 is stored in the other-player game device 1 having transmitted the connection request (S11: YES), the CPU 11, in response to the connection request, transmits a connection response to the game device 1 having transmitted the connection request (S12). This connection response contains the application information D23 stored in the player game device 1. Note that the application information D23 is used when the other-player game device 1 executes step S3.

After that, the CPU 11 executes StreetPass communication data reception process which is the same as step S7 (S13). After that, the CPU 11 determines whether player acquisition data D3b is obtained in step S13, as is done in step S8 (S14). When it is determined that the player acquisition data D3b is obtained (S14: YES), the CPU 11 transmits an acquisition notice as is done in step S9 (S15). The process then proceeds to step S16 under control of CPU 11. On the other hand, when it is determined that no player acquisition data D3b is received (S14: NO), the process proceeds to step S16 without proceeding to step S15, under control of the CPU 11.

In step S16, the CPU 11 transmits the StreetPass communication data D1 as is done in step S4. After that, the CPU 11 determines whether an acquisition notice is received from the other-player game device 1, as is done in step S5 (S17). When it is determined that the acquisition notice is received from the other-player game device 1 (S17: YES), the CPU 11 updates the other-player acquisition data D3a in the transmission box D101 of the communication-use data D100, as is done in step S6 (S18). The CPU 11 then ends the StreetPass communication process. When it is determined that no acquisition notice is received from the other-player game device 1 (S17: NO), the StreetPass communication process ends without proceeding to step S18 under control of the CPU 11.

[Main Process]

Figure 12:
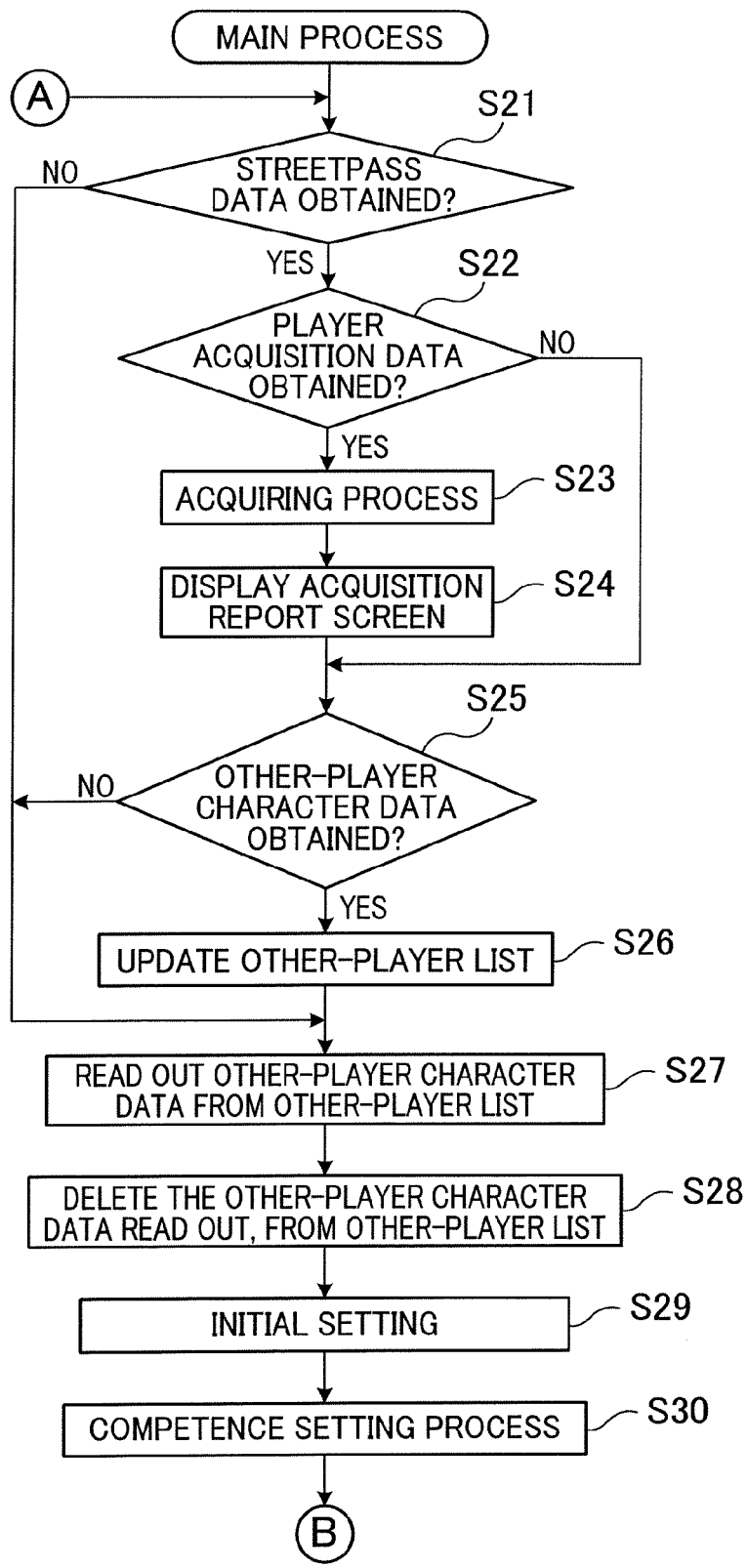
FIG. 12 shows an example non-limiting flowchart (part 1) of a main process.
Figure 13:
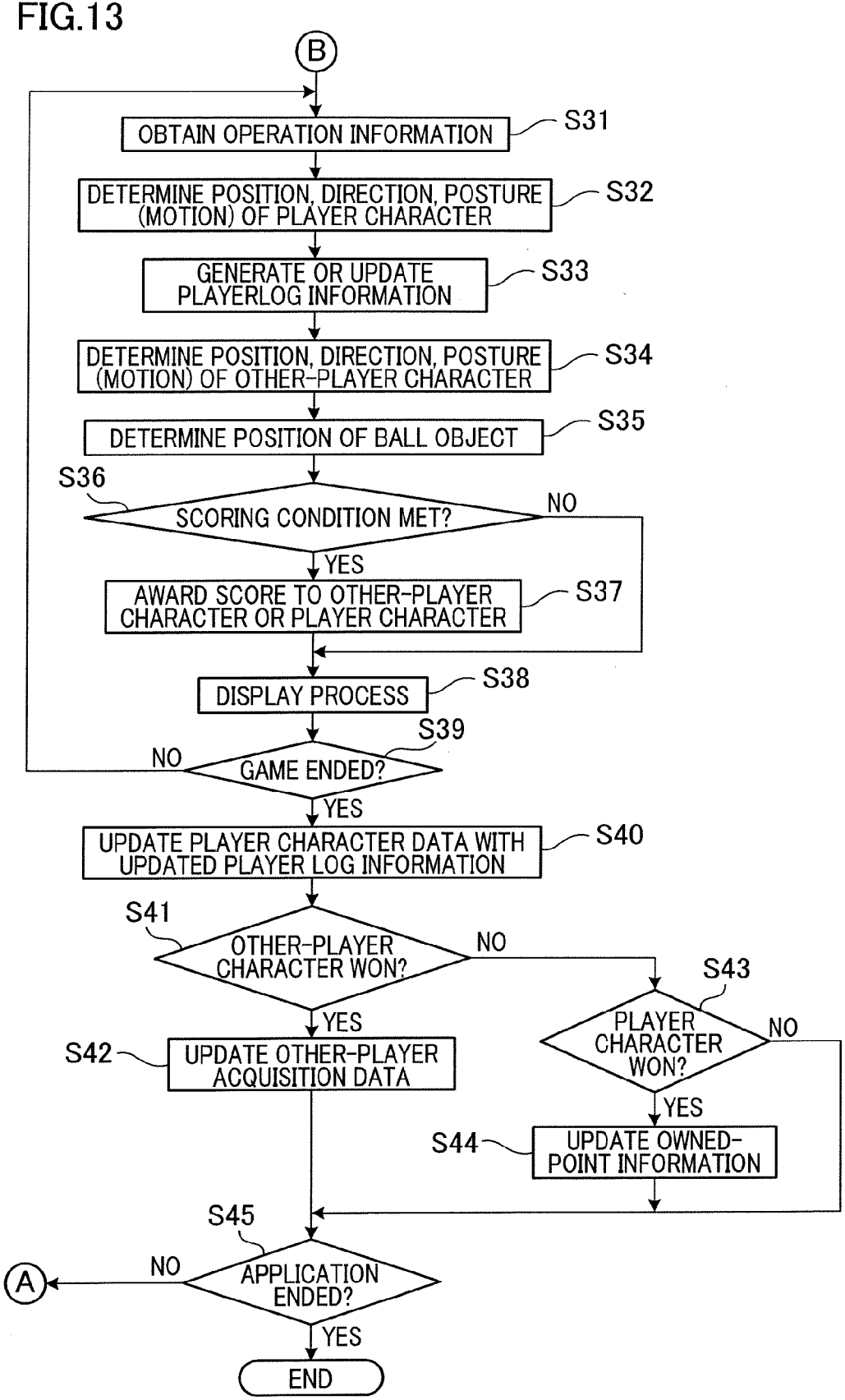
FIG. 13 shows an example non-limiting flowchart (part 2) of a main process.

The following describes an example of the main process related to the first embodiment, with reference to FIG. 4 to FIG. 9, FIG. 12, and FIG. 13. FIG. 12 shows an example non-limiting flowchart (part 1) of a main process. FIG. 13 shows an example non-limiting flowchart (part 2) of a main process. For example, the main process is executed when an instruction to start the application program P2 is entered by the player.

First, the CPU 11 determines whether the StreetPass communication data D1 is obtained from any other-player game device 1 (S21). In this step, the CPU 11 determines whether the StreetPass communication data D1 (other-player character data D2b or player acquisition data D3b) is registered to the reception box D102. When it is determined that no Street-Pass communication data D1 is obtained (S21: NO), the process proceeds to later-described step S27 under control of the CPU 11.

On the other hand, when it is determined that the StreetPass communication data D1 is obtained from an other-player game device 1 (S21: YES), the CPU 11 determines whether the player acquisition data D3b is obtained (S22). Here, the CPU 11 determines whether the player acquisition data D3b is registered to the reception box D102. When it is determined that player acquisition data D3b is obtained (S22: YES), the CPU 11 executes an acquiring process (S23). In the acquiring process, the player acquisition data D3b with the latest reception timestamp is read out from the reception box D102. From the player acquisition data D3b read out, the CPU 11 obtains the acquisition information D30 corresponding to the player character identification information D13a. Then, the CPU 11 updates the owned-point information D22 so that the number of player-owned game points increases by the number of game points indicated by the acquisition information D30. This way, the player is able to acquire the number of game points (score) indicated by the acquisition information D30.

After that, the CPU 11 deletes all the player acquisition data D3b in the reception box D102. Note that, in the first embodiment, the CPU 11 receives acquisition information D30 only from the player acquisition data D3b with the latest reception timestamp; however, the technology herein is not limited to this structure, and the acquisition information D30 may be obtained from every set of the player acquisition data D3b in the reception box D102.

Subsequently, the CPU 11 displays an acquisition report screen for reporting the acquisition of the game points to the player (S24). Then, the process proceeds to the subsequent step S25 under control of the CPU 11. Note that, when it is determined that no player acquisition data D3b is obtained (S22: NO), the process proceeds to step S25 without executing steps S23 and S24 under control of the CPU 11.

In step S25, the CPU 11 determines whether the other-player character data D2b is obtained. When it is determined that the other-player character data D2b is obtained (S25: YES), the CPU 11 updates the other-player list D21 (D26). Specifically, the CPU 11 registers to the other-player list D21 the other-player character data D2b received. Note that the other-player character data D2b is registered along with the sequence information D221. Note further that, when a plurality of sets of other-player character data D2b are registered to the reception box D102, all the sets of the other-player character data D2b are registered to the other-player list D21. After this, the process proceeds to step S27 under control of the CPU 11.

When it is determined that no other-player character data D2b is obtained (S25: NO), the process proceeds to step S27 without executing step S26, under control of the CPU 11.

In step S27, the CPU 11 reads out one set of other-player character data D2b from the other-player list D21. Then, the CPU 11 deletes that one set of other-player character data D2b from the other-player list D21 (S28). Note that the set of the other-player character data D2b to be read out is determined by referring to the sequence information D221 of the other-player list D21.

After that, the CPU 11 executes initial setting for executing a tennis game (S29). In this initial setting, the CPU 11 executes a process of building a three-dimensional virtual game space. This process includes: an other-player character positioning process, a player character positioning process, and a ball object positioning process.

In the other-player character positioning process, the CPU 11 generates an other-player character O2 based on the other-player character data D2b read out in step S27, and positions the other-player character O2 at its initial position in the game space. Note that, in the other-player character positioning process, the main body of the other-player character O2 is generated based on the other-player character generation information D5b in the other-player character data D2b. Further, the other-player character O2 is equipped with a decoration item A1 based on the other-player decoration item information D6b in the other-player character data D2b.

In the player character positioning process, the CPU generates a player character O1 based on the player character data D2a, and positions the player character O1 at its initial position in the game space. Note that, in the player character positioning process, the main body of the player character O1 is generated based on the player character generation information D5a in the player character data D2a. Meanwhile, the other-player character is equipped with a decoration item A1 based on the player decoration item information D6a in the player character data D2a.

In the ball object positioning process, the CPU 11 positions a ball object O3 at its initial position in the game space (e.g. at a position of the right hand of the player character O1 or the other-player character O2, or the like).

Then, the CPU 11 executes a process of setting status parameters indicating the performances of the player character O1 and the other-player character O2 (competence setting process) (S30). The status parameter indicating the performance of the player character O1 is determined based on the player decoration item information D6a in the player character data D2a. The status parameter indicating the performance of the other-player character O2 is determined based on the other-player decoration item information D6b in the other-player character data D2b.

As shown in FIG. 13, the CPU 11 repeats the process from step S31 to step S39 at every cycle of drawing (e.g., at every 1/60 sec), until the CPU 11 determines in step S39 that the game is ended. The following describes the process from step S31 to step S39.

In step S31, the CPU 11 obtains operation information D4 from the controller 20 (S31). Then, the CPU 11 determines the position, the direction, and the posture (motion) of the player character O1 in the game space, based on the operation information D4 thus obtained (S32). Based on these conditions determined, the player character image generation data D10 stored in the main memory 12 is updated. The position, the direction, and the posture (motion) of the player character O1 are determined based on the status parameter of the player character O1 set in step S30.

After this, the CPU 11 updates the player log information D7a in the main memory 12 (or generates player log information D7a and stores the same in the main memory 12) based on the conditions determined in step S32 (S33). For example, the player log information D7a is generated or updated so as to include information indicating the service position of the player character O1 and the type of shot.

Next, the CPU 11 determines the position, the direction, and the posture (motion) of the other-player character O2 (S34). Based on these conditions determined, the other-player character image generation data D11 stored in the main memory 12 is updated. The position, the direction, and the posture (motion) of the other-player character O2 are determined based on the status parameter of the other-player character O2 set in step S30. Further, the position, the direction, and the posture (motion) of the other-player character O2 are determined based on the other-player log information D7b in the other-player character data D2b, based on which the other-player character O2 is generated.

For example, there are three service positions P1 to P3 for the other-player character O2 as shown in FIG. 3, and at which position the other-player character O2 serves is determined based on the other-player log information D7b. For example, the other-player log information D7b indicates the service positions of the past several (e.g. eight) services by the player character O1 of the other player game device 1 in the tennis game of the other-player game device 1. Then, the player game device 1 may randomly determine one of the eight services and may position the other-player character O2 at the service position of the randomly determined service position. Further, the other-player log information D7b indicates the type of shot and/or the angle of shot in the past several shots made by the player character O1 of the other-player game device 1, and the motion of the other-player character O2 may be determined so that the type of shot and/or the angle of the shot is/are that/those of any one of the past several shots (e.g., eight shots).

Then, the CPU 11 determines the position of the ball object O3 in the game space (S35). In this process, for example, whether the player character O1 hits the ball object O3 is determined based on the position, the direction, and the posture (motion) of the player character O1 determined in step S32. This is determined, based on the position, the direction, and the posture (motion) of the other-player character O2 determined in step S34. Based on these determinations, the moving direction or the moving speed of the ball object O3 is calculated, and the position of the ball object O3 in the game space is determined.

Next, the CPU 11 determines whether a scoring condition has been met (S36). The scoring condition is a condition to be satisfied in the tennis game for awarding a score to one of the player character O1 and the other-player character O2. For example, such a condition include the ball object O3 contacting the ground in a situation where the player character O1 is supposed to hit the ball object O3. Further, such a condition include the ball object O3 contacting the ground in a situation where the other-player character O2 is supposed to hit the ball object O3.

When it is determined that the scoring condition is met (S36: YES), the CPU 11 awards a score to the player character O1 or the other-player character O2, according to the scoring condition met (S37). For example, when the ball object O3 contacts the ground in the situation where the player character O1 is supposed to hit the ball object O3, a score is awarded to the other-player character O2. This is done by updating the other-player score information D9. Further, when the ball object O3 contacts the ground in the situation where the other-player character O2 is supposed to hit the ball object O3, a score is awarded to the player character O1. This is done by updating the player score information D8. After this, the process proceeds to later-described step S38 under control of the CPU 11.

On the other hand, when it is determined that no scoring condition has been met (S36: NO), the process proceeds to the later-described step S38 without executing step S37 under control of the CPU 11.

In step S38, the CPU 11 executes a process of generating a game image based on the result of the process from step S31 to step S37, and displays the game image on the display device 17 (S38). Then, the CPU 11 determines whether the tennis game is ended (S39), and when it is determined that the tennis game has not yet ended (S39: NO), the process retunes to step S31. On the other hand, when it is determined that the tennis game has ended (S39: YES), the CPU 11 updates the player character data D2a stored in the save data memory 13 and the player character data D2a registered to the transmission box D101, based on the player log information D7a generated or updated in step S33 (S40).

Next, the CPU 11 determines whether the other-player character O2 has won (S41). This is done based on the player score information D8 and the other-player score information D9. When it is determined that the other-player character O2 won (S41: YES), the CPU 11 updates the other-player acquisition data D3a in the transmission box D101 (S42). Specifically, based on the other-player score information D9, the CPU 11 calculates the game points to be awarded to the game device 1 having transmitted the other-player character data D2b, and generates acquisition information D30 indicating the calculated game points. Then, the CPU 11 puts, in the other-player acquisition data D3a, the other-player character identification information D13b in the other-player character data D2b and the acquisition information D30 generated, in association with each other. After this, the process proceeds to step S45 under control of the CPU 11.

On the other hand, when it is determined that the other-player character O2 did not win (S41: NO), the CPU determines whether the player character O1 has won (S43). When it is determined that the player character O1 won (S43: YES), the CPU 11 updates the owned-point information D22 stored in the save data memory 13 (S44). Specifically, the CPU 11 calculates the game points to be awarded to the player based on the player score information D8, and updates the owned-point information D22 so that the number of game points is increased by the game points calculated. After this, the process proceeds to step S45 under control of the CPU 11. On the other hand, when it is determined that the player character O1 did not win (draw) (S43: NO), the process proceeds to step S45 without executing step S44 under control of the CPU 11.

In step S45, the CPU 11 determines whether termination of the application program P2 is instructed. When it is determined that termination of the application program P2 is not instructed (S45: NO), the process returns to step S21, under control of the CPU 11. On the other hand, when it is determined that termination of the application program P2 is instructed (S45: YES), the CPU 11 ends the main process.

As described above, in the first embodiment, the other-player character data D2b is automatically received from the other-player game device 1 through the StreetPass communication, and the other-player character O2 is generated by using this other-player character data D2b. Then, a tennis game is executed using this other-player character O2 and the player character O1. Further, there is generated acquisition information D30 for awarding the predetermined number of game points (score) according to the result of the tennis game to the other-player game device 1. The other-player acquisition data D3a containing this acquisition information D30 is automatically transmitted to the other-player game device 1 through the StreetPass communication. The other-player game device 1 having received the other-player acquisition data D3a is able to get the game points based on the acquisition information D30 in the other-player acquisition data D3a received. Thus, to the game device 1 having transmitted the other-player character data D2b, the game points according to the result of the tennis game using the other-player character data D2b is awarded. This way, the result of tennis game using the other-player character data D2b received is sent as a feedback to the other-player game device 1 having transmitted the other-player character data D2b.

Further, the game device 1 automatically transmits the player character data D2a to an other-player game device 1 through the StreetPass communication. The other-player game device 1 obtains the player character data D2a as the other-player character data D2b, and executes the above-mentioned tennis game. Then, from the other-player game device 1, the game device 1 automatically receives the player acquisition data D3b containing acquisition information D30 according to the result of the tennis game, through the StreetPass communication. The game device 1 is then able to get the game points based on the acquisition information D30 in the player acquisition data D3b. Thus, from the other-player game device 1, the game device 1 having transmitted the other-player character data D2b is able to acquire the game points according to the result of tennis game using the other-player character data D2b. This way, the game device 1 having transmitted the other-player character data D2b is able to receive as a feedback the result of the tennis game using the other-player character data D2b, from the other-player game device 1.

Second Embodiment

The following describes a second embodiment. The first embodiment deals with a competing tennis game in which the player character O1 and the other-player character O2 compete against each other. The second embodiment on the other hand deals with a cooperating tennis game in which a player character O1 cooperates with an other-player character O2 to progress a predetermined game (later-described ring game).

The following describes only the difference of the second embodiment from the first embodiment. Structures not particularly described in the second embodiment are the same as those of the first embodiment.

[Game of Second Embodiment Using Character Data Received]

Figure 14:
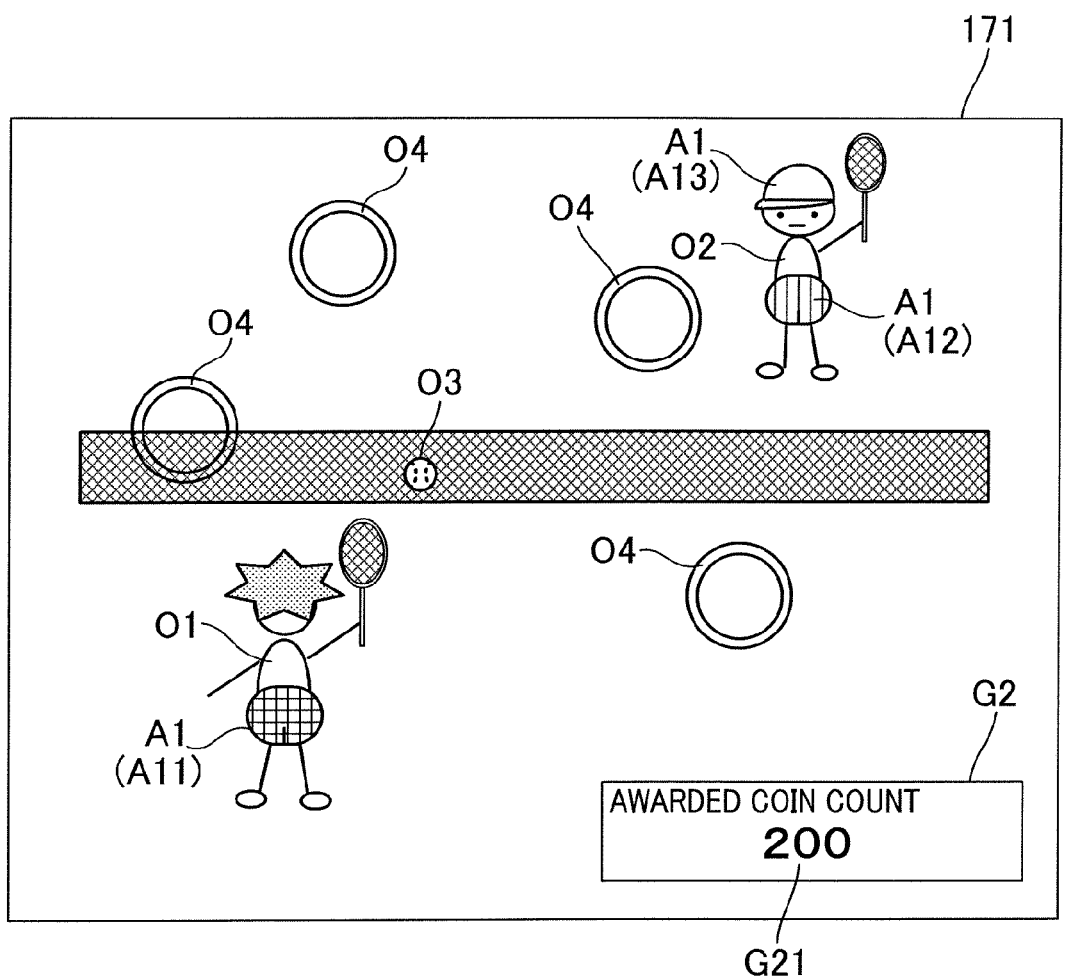
FIG. 14 shows an example non-limiting screen of a game device related to a second embodiment.

First, the following describes a tennis game related to the second embodiment, with reference to FIG. 14. FIG. 14 shows an example non-limiting screen of the game device related to the second embodiment. In the first embodiment, the acquisition information D30 is information which enables the other-player game device 1 to acquire a certain number of game points based on the score of the other-player character O2 in the tennis game. In the second embodiment on the other hand, the player character O1 makes the ring game progress in cooperation with the other-player character O2 to earn game coins (example of a predetermined item). The acquisition information D30 here is information which enables the other-player game device 1 to acquire a certain number of game coins (example of the acquisition) earned by the player character O1 and the other-player character O2.

The following describes the ring game executed in the tennis game related to the second embodiment. A ring object O4 (example of an item object) is arranged within a tennis court in the game space. Every time the ball object O3 passes the ring object O4, a predetermined number of game coins (e.g., 10 coins) are awarded to the player character O1 and the other-player character O2. Note that the number of game coins awarded to the player character O1 and the other-player character O2 is indicated by a coin-count gauge G2. When the tennis game ends, acquisition information D30 is generated which enables the game device 1 having transmitted the other-player character data D2b to acquire the game coin(s) awarded to the player character O1 and the other-player character O2.

[Memory Map of Second Embodiment]

Next, the following describes data and a program to be stored in a main memory 12 of the second embodiment, with reference to FIG. 4. The main memory 12 stores therein the ring-image generating data D41, in addition to the programs P1 and P2, data D2b, D4 to D7, and D10 to D12. Further, the main memory 12 stores therein awarded coin count information D42, in places of the player score information D8 and the other-player score information D9.

The ring-image generating data D41 is data for generating an image of the ring object O4, and indicates the position of the ring object O4 in the game space. Further, the awarded coin count information D42 indicates the number of currently owned game coins awarded to the player character O1 and the other-player character O2 in the tennis game.

Next, the following describes data to be stored in the save data memory 13 of the second embodiment, with reference to FIG. 7. In the save data memory 13, owned item information D45 is stored in addition to the data D2a, D100, D21, D23. The owned item information D45 is information indicating the number of owned game coins of the player game device 1. The greater the number of owned game coins, the more advantageous the conditions of the tennis game become for the player character O1 (e.g., the status is upgraded, or a decoration item A1 is awarded).

Figure 15:
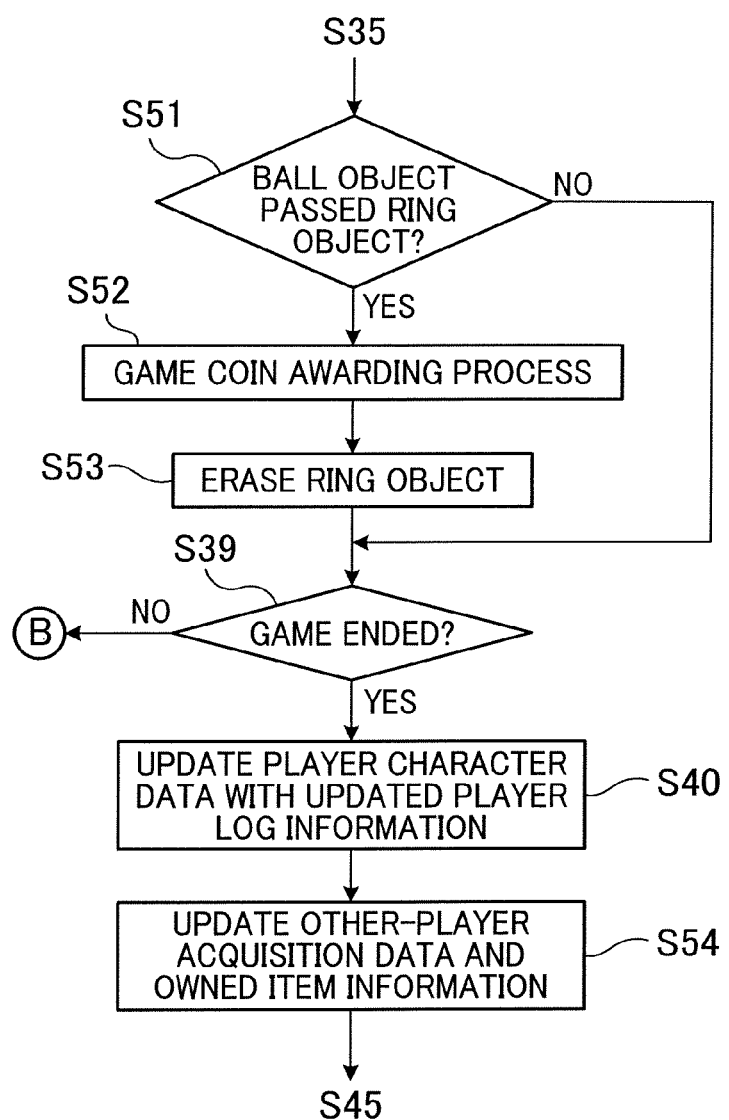
FIG. 15 shows an example non-limiting flowchart of a main process related to the second embodiment.

The following describes a main process related to the second embodiment, with reference to FIG. 4, FIG. 6, FIG. 12, FIG. 13, and FIG. 15. FIG. 15 shows an example non-limiting flowchart of the main process related to the second embodiment.

As shown in FIG. 12, the main process of the second embodiment includes step S21 to step S29 which are the same as those of the first embodiment. The initial setting in step S30 is also similar to that of the first embodiment; however, is different only in that the ring object O4 is arranged in the game space. The ring object O4 is arranged based on the ring-image generating data D41 shown in FIG. 4.

As shown in FIG. 13 and FIG. 15, after the initial setting, step S31 to step S35 are executed in the main process of the second embodiment, similarly to the main process of the first embodiment. After that, the CPU 11 determines whether the ball object O3 has passed the ring object O4 (S51). For example, in step S51, the CPU 11 determines whether a collision area of the ball object O3 touched a collision area of the ring object O4. When the both collision areas touch each other, it is determined that the ball object O3 passed the ring object O4.

When it is determined that the ball object O3 passed the ring object O4 (S51: YES), the CPU 11 executes a process of awarding a predetermined number of game coins to the player character O1 and the other-player character (game coin awarding process) (S52). Specifically, the CPU 11 updates the awarded coin count information D42 so that the number of game coins is increased by the predetermined number of game coins awarded. After that, the CPU 11 executes a process of erasing, from the game space, the ring object O4 through which the ball object O3 has passed (S53). This is done by updating the ring-image generating data D41. After that, the CPU 11 determines whether the tennis game is ended (S39). Further, when it is determined that the ball object O3 did not pass the ring object O4 (S51: NO), the CPU 11 determines whether the tennis game is ended, without executing steps S52 and S53 (S39).

When it is determined that the tennis game is not ended (S39: NO), the process returns to step S31 under control of the CPU 11, as is the case with the first embodiment. On the other hand, when it is determined that the tennis game is ended (S39: YES), the CPU 11 executes step S40 to update the player character data D2a stored in the save data memory 13 and the player character data D2a registered to the transmission box D101, as is the case with the first embodiment.

After that, the CPU 11 updates the other-player acquisition data D3a registered to the transmission box D101 and the owned item information D45 stored in the save data memory 13 (S54). Specifically, the CPU 11 generates acquisition information D30 which enables the other-player game device 1 to acquire a certain number of game coins indicated by the awarded coin count information D42 in the main memory 12. Then, the CPU 11 registers the acquisition information D30 generated to the other-player acquisition data D3a, in association with the other-player character identification information D13b. Further, the CPU 11 updates the owned item information D45 so that the number of owned game coins increases by the number indicated by the awarded coin count information D42 in the main memory 12.

Note that, in the first embodiment, the acquisition information D30 (the other-player acquisition data D3a containing acquisition information D30) is transmitted to the game device 1 having transmitted the other-player character data D2b, only when the other-player character wins the tennis game. Further, the owned-point information D22 is updated only when the player character O1 wins. To the contrary, in the second embodiment, the owned item information D45 is always updated and the acquisition information D30 is always transmitted, as long as a game coin is awarded to the player character O1 and the other-player character O2 at the end of the tennis game.

The second embodiment brings about the same action and effects brought about by the first embodiment. In the second embodiment, the game coin to be acquired by the player game device 1 and the other-player game device 1 is awarded by the player character O1 and the other-player character O2 playing the tennis game in cooperation with each other. This causes the player of the game device 1 to wish for an other-player character data D2b to cooperate with, for the purpose of achieving a preferable game result, and when receiving such other-player character data D2b, causes the player to be delighted.

Third Embodiment

Figure 16:
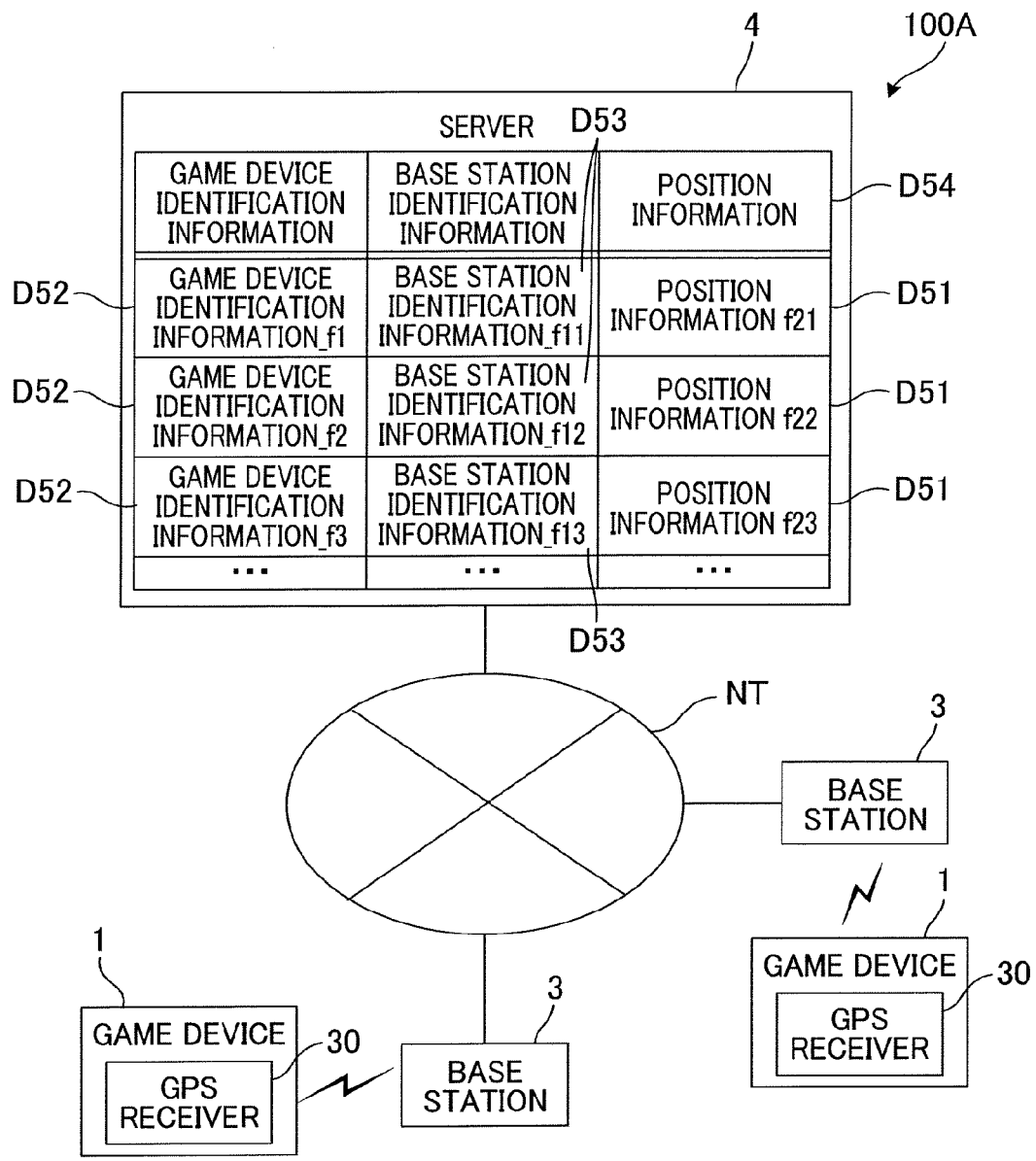
FIG. 16 shows an example non-limiting game system of a third embodiment.

The following describes a third embodiment with reference to FIG. 16. FIG. 16 shows an example non-limiting game system of a third embodiment. A game system 100A related to the third embodiment includes: a plurality of game devices 1; a plurality of base stations 3 each capable of conducting wireless communication with the game devices 1; and a server 4 capable of communicating with the base stations 3 via a network NT. Note that FIG. 16 only shows two game devices 1 and two base stations; however, the number of the game devices 1 and that of base stations may be three or more.

In the first and second embodiments, two game devices 1 conduct direct short distance wireless communication (StreetPass communication) to transmit and receive character data D2 and acquisition data D3 to and from each other, without another device relaying the communication. In the third embodiment on the other hand, two game devices 1 while being close to each other conduct wireless communication with each other via the base stations 3, the server 4, and the network NT, thus transmitting and receiving the character data D2 and acquisition data D3 to and from each other.

More specifically, each of the game devices 1 has a GPS (Global Positioning System) receiver 30, and is capable of specifying the position (latitude and longitude) of itself, based on a radio wave received by the GPS receiver 30 from a GPS satellite and generating position information D51 indicating the position. Then, at every predetermined cycle (every several seconds), each game device 1 transmits the position information D51 generated to the server 4 via closest one of the base stations 3 and a wide area network NT. Note that, to the position information D51, game device identification information D52 which is a unique identifier of each game device 1 is added.

Note that, the base station 3 and the game device 1 conduct wireless communication (e.g., communication using a mobile telephone line, wireless communication based on the communication standard IEEE802.11b/g). Then, when the base station 3 relays the communication from the game device 1 to the server 4, the base station 3 adds to the position information D51 base station identification information D53 which is a unique identifier of the base station 3 and then transmits the position information D51 to the server 4.

The server 4 stores a position information table D54. To this position information table D54 are registered the position information D51 from the game device 1, in association with the game device identification information D52 and the base station identification information D53 added to the position information D51.

The server 4 refers to the position information D51 registered to the position information table D54 at every predetermined cycle, to determine whether there are two game devices 1 positioned within a predetermined distance from each other. When there are two game devices 1 within the predetermined distance from each other, the server 4 sends to the game devices 1 a request for transmission of the StreetPass communication data D1 (player character data D2a, other-player acquisition data D3a). This request is made by using the game device identification information D52 and the base station identification information D53. When the StreetPass communication data D1 is received in response to the request from the game device 1, the server 4 transmits to the other game device the StreetPass communication data D1 received. This transmission of the StreetPass communication data D1 is done by using the game device identification information D52 and the base station identification information D53.

As described, in the third embodiment, each game device 1 transmits or receives the StreetPass communication data D1 by means of wireless communication via the base stations 3, server 4, and the network NT. Having the server 4 relaying the communication between two game devices 1 to transmit and receive the StreetPass communication data D1 to and from each other is advantageous in that the range (distance) in which the game devices 1 are able to communicate with each other is not limited to the range in which the game devices 1 are able to directly communicate with each other. This enables transmission and reception of the StreetPass communication data D1 between game devices 1, even in areas where the game devices 1 are not widely spread and two game devices 1 are hardly positioned within a communicable range from each other.

While the third embodiment brings about the above-described advantageous effect, the following advantageous effect is brought about by the structure of the first and the second embodiments in which two game devices 1 conduct the StreetPass communication to transmit and receive the StreetPass communication data D1. Namely, even when the communication state with another device is not good, transmission and reception of the StreetPass communication data D1 is possible as long as the communication state between the game devices 1 are good.

(Modification)

(1) The first embodiment deals with a case of executing a competing game; however, the competing game is not limited to the tennis game. For example, the competing game may be a competition other than the tennis game in which players compete against each other (ball games, race, or the like), a fighting game in which players fight against each other, or the like. For example, it is possible to adopt a golf game which is played by players in cooperation with each other or against each other (competition), and in which game the players alternately make shots to progress the game, and transmit the score resulting from the golf game.

(2) In the first embodiment, the acquisition information D30 is transmitted to the other-player game device 1 to enable the other-player game device 1 to acquire a certain number of game points (score) based on the score of the other-player character O2 in the tennis game; however, the present invention is not limited to this. For example, the acquisition may be the score itself of the other-player character in the game. Further, the acquisition may be a predetermined item (e.g., game coins or the like in the second embodiment) based on the score. Alternatively, the acquisition may be a replay video or the like of the tennis game, or a benefit such as a special stage or the like.

(3) In the first embodiment, the acquisition of the other-player portable game device 1 is a certain number of game points based on the score of the other-player character O2 in the tennis game. Further, the acquisition of the player game device 1 is a certain number of game points based on the score of the player character O1 in the tennis game. As should be understood, in the first embodiment, the acquisition of the player game device 1 and that of the other-player game device 1 are different; however, the same acquisition may be given to the player and the other-player game device 1.

(4) In the first embodiment, the acquisition information D30 is generated only when the other-player character O2 wins a tennis game; however, the acquisition information D30 may be generated when the other-player character O2 did not win a game.

(5) In the second embodiment, the cooperating tennis game is executed; however, the cooperating game executed may be a game other than a tennis game. For example, the cooperating game may be a competition other than the tennis game (ball games, race, or the like), a fighting game, or the like, in which the player character O1 cooperating with the other-player character O2. The "the player character O1 cooperating with the other-player character O2" means, for example, the player character O1 and the other-player character O2 helping each other to obtain an item in a game space, or the player character O1 and the other-player character O2 forming a tag-team to fight or compete against an other-player team or an enemy character.

(6) In the second embodiment, the awarded coin count information D42 is updated when the ball object O3 passes the ring object O4; however, the item object is not limited to the ring object O4, and may be any object as long as the object is arranged in the game space. Further, the "predetermined game" progressed by the player character O1 and the other-player character O2 in cooperation with each other is not limited to the ring game. For example, the predetermined game to be progressed may be such that a ball object O3 is shot within a predetermined period after the previous shot.

(7) In the second embodiment, the acquisition of the other-player portable game device 1 is a game coin (predetermined item) awarded to the player character O1 and the other-player character O2 in the tennis game; however, the present invention is not limited to this. For example, the acquisition may be an item object (ring object O4) or the like, which the player character O1 and the other-player character O2 have let the ball object O3 pass during a tennis game. Further, the acquisition may be a score or the like which the player character O1 and the other-player character O2 have earned during the game (e.g., the game points or the like in the first embodiment). Alternatively, the acquisition may be a replay video or the like of the tennis game, or a special stage or the like.

(8) In the first embodiment and the second embodiment, the character identification information D13 is contained in the acquisition data D3, and is used when determining whether to obtain the player acquisition data D3b in the StreetPass communication process. The same is done by using a MAC address in place of the character identification information D13.

(9) The communication scheme between game devices 1 in the first embodiment and the second embodiment may be a communication scheme in compliance with the communication standard of Bluetooth (Registered Trademark); a communication scheme in compliance with the communication standard of IrDA, or the like, in addition to the above described predetermined communication schemes.

(10) The structures of the game system and the game device in any of the first to third embodiments may be modified as needed. Further, the game device 1 does not necessarily have to be a device dedicated for games; and the game device 1 may be a PDA (Personal Digital Assistant), a mobile phones (encompassing smart phones), or the like, as long as these devices are capable of executing a game by running a game application program. Further, the main process of the game device 1 may partially take place in another information processing device such as the server.

What is claimed is:

1. A game system including a player portable game device and at least one other-player portable game device which, while being close to each other, are capable of automatically conducting wireless communication with each other even when no game program is running, the system comprising:
   an other-player data receiver configured to automatically receive other-player data from the other-player portable game device through the wireless communication;
   an other-player generator configured to generate an other-player character based on the other-player data;
   a game processor configured to execute a game with the other-player character which is automatically controlled and a player character which is an object controllable by a player;
   an acquisition information generator configured to generate acquisition information which enables the other-player portable game device to acquire an acquisition based on a result of the game, the acquisition being at least one of a predetermined item, a score, and a benefit;
   a transmitter configured to transmit the acquisition information to the other-player portable game device by automatically conducting wireless communication with the other-player portable game device after the acquisition information is generated;
   an acquisition information receiver configured to automatically receive the acquisition information through the wireless communication; and
   a first acquirer configured to acquire the acquisition based on the acquisition information received.

2. The game system according to claim 1, wherein the game processor executes a competing game in which the player character and the other-player character compete against each other.

3. The game system according to claim 2, further comprising a judging component configured to judge which one of the player character and the other-player character wins the competing game,
   wherein the acquisition information generator generates the acquisition information only when the other-player character wins, based on a result of judgment by the judging component.

4. The game system according to claim 3, further comprising a second acquirer which, when the player character wins based on the judgment by the judging component, enables the player portable game device to acquire an acquisition identical to or different from the acquisition acquired by the other-player portable game device.

5. The game system according to claim 1, wherein the game processor executes a cooperating game in which the player character cooperates with the other-player character to progress the game.

6. The game system according to claim 5, further comprising a third acquirer which enables the player to acquire the acquisition according to a result of the game executed by the game processor,
   wherein the acquisition information generator generates the acquisition information which enables the other-player portable game device to acquire the acquisition identical to the acquisition acquired by the player with the use of the third acquirer.

7. The game system according to claim 5, wherein: the game processor executes a game in which the player character plays a ball game against the other-player character; and the system further comprises a determiner configured to determine the acquisition based on passing of a ball object through an item object arranged in a game space of the ball game; and
   the acquisition information generator generates the acquisition information which enables the other-player portable game device to acquire the acquisition determined by the determiner.

8. The game system according to claim 1, further comprising: a player data generator which generates player data to be used as the other-player data in the other-player portable game device,
   wherein the transmitter transmits the player data to the other-player portable game device.

9. The game system according to claim 1, further comprising a log storage configured to store playing log and/or a status of the game played by the player,
   wherein the player data generator generates the player data containing the playing log and/or the status of the game stored in the log storage, and
   the game processor controls motions of the other-player character generated based on playing log and/or a status of the game contained in the other-player data.

10. The game system according to claim 1, wherein the other-player data receiver and the transmitter directly conduct the wireless communication with the other-player portable game device, without having another device relaying the wireless communication.

11. The game system according to claim 1, further comprising a position specifying unit configured to specify the position of the player portable device,
   wherein, when the player portable device is determined as to be nearby the other-player portable device based on the specified position of the player portable device, the other-player data receiver and the transmitter conduct the wireless communication with the other-player portable device via a predetermined server.

12. A method of controlling games using a player portable game device and at least one other-player portable game device which, while being close to each other, are capable of automatically conducting wireless communication with each other even when no game program is running, the method comprising:
   (a) automatically receiving other-player data from the other-player portable game device through the wireless communication;
   (b) generating an other-player character based on the other-player data;
   (c) executing a game with the other-player character which is automatically controlled and a player character which is an object controllable by a player;
   (d) generating acquisition information which enables the other-player portable game device to acquire an acquisition based on a result of the game, the acquisition being at least one of a predetermined item, a score, and a benefit; and
   (e) transmitting the acquisition information to the other-player portable game device by automatically conducting wireless communication with the other-player portable game device after the acquisition information is generated.

13. The method according to claim 12, wherein, in step (c), a competing game is executed in which the player character and the other-player character compete against each other.

14. The method according to claim 12, further comprising step of (f) judging which one of the player character and the other-player character wins the competing game, Wherein, in step (d), the acquisition information is generated only when the other-player character wins, based on the result of judgment in step (f).

15. The method according to claim 14, further comprising step of (g), when the player character wins based on the result of judgment in step (f), enabling the player portable game device to acquire an acquisition identical to or different from the acquisition acquired by the other-player portable game device.

16. The method according to claim 12, wherein, in step (c), a cooperating game is executed in which the player character cooperates with the other-player character to progress the game.

17. The method according to claim 16, further comprising step of (h) enabling the player to acquire the acquisition according to a result of the game executed in step (c), Wherein, in step (d), the acquisition information is generated which enables the other-player portable game device to acquire the acquisition identical to the acquisition acquired by the player in step (h).

18. The method according to claim 16, wherein, in step (c), a game is executed in which the player character plays a ball game against the other-player character;

the method further comprises a step of (i) determining the acquisition based on passing of a ball object through an item object arranged in a game space of the ball game; and in step (d), the acquisition information is generated which enables the other-player portable game device to acquire the acquisition determined in step (i).

19. The method according to claim 12, further comprising a step of (j) generating player data to be used as the other-player data in the other-player portable game device, Wherein, in step (e), the player data is transmitted to the other-player portable game device.

20. The method according to claim 19, further comprising a step of (l) storing playing log and/or a status of the game played by the player, wherein, in step (j), the player data containing the playing log and/or the status of the game stored in the log storage is generated, and in step (c), controls motions of the other-player character generated based on playing log and/or a status of the game contained in the other-player data.

21. The method according to claim 12, wherein, in step (a) and step (e), the wireless communication is directly conducted with the other-player portable game device, without having another device relaying the wireless communication.

22. The method according to claim 12, further comprising step of (m) specifying the position of the player portable device, wherein, when the player portable device is determined as to be nearby the other-player portable device based on the specified position of the player portable device, the wireless communication is conducted in step (a) and step (e) with the other-player portable device via a predetermined server.

23. A portable game device capable of automatically conducting wireless communication with another portable game device even when no game program is running, the device comprising:

an other-player data receiver configured to automatically receive other-player data from the other portable game device through the wireless communication;

an other-player generator configured to generate an other-player character based on the other-player data;

a game processor configured to execute a game with the other-player character which is automatically controlled and a player character which is a player-controllable object;

an acquisition information generator configured to generate acquisition information which enables the other portable game device to acquire an acquisition based on a result of the game, the acquisition being at least one of a predetermined item, a score, and a benefit; and a transmitter configured to transmit the acquisition information to the other portable game device by automatically conducting wireless communication with the other portable game device after the acquisition information is generated.

24. A computer-readable non-transitory storage medium storing therein a game control program which causes a portable game device to automatically conduct wireless communication with another portable game device positioned nearby even when no game program is running, the program causing a computer of the portable game device to serve as:

an other-player data receiver configured to automatically receive other-player data from the other portable game device through the wireless communication;

an other-player generator configured to generate an other-player character based on the other-player data;

a game processor configured to execute a game with the other-player character which is automatically controlled and a player character which is a player-controllable object;

an acquisition information generator configured to generate acquisition information which enables the other portable game device to acquire an acquisition based on a result of the game, the acquisition being at least one of a predetermined item, a score, and a benefit; and a transmitter configured to transmit the acquisition information to the other portable game device by automatically conducting wireless communication with the other portable game device after the acquisition information is generated.

* * * * *